US012574735B2

(12) United States Patent
Deshmukh et al.

(10) Patent No.: US 12,574,735 B2
(45) Date of Patent: Mar. 10, 2026

(54) METHOD AND APPARATUS FOR SELECTING SELECTIVE SECURITY MODE AND FLOW MANAGEMENT IN A WIRELESS COMMUNICATION SYSTEM

(71) Applicant: Samsung Electronics Co., Ltd., Suwon-si (KR)

(72) Inventors: Aneesh Deshmukh, Bangalore (IN); Neha Sharma, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 18/488,472

(22) Filed: Oct. 17, 2023

(65) Prior Publication Data

US 2024/0129737 A1     Apr. 18, 2024

(30) Foreign Application Priority Data

Oct. 17, 2022     (IN) .............................. 202241059279
Sep. 25, 2023     (IN) ............................ 2022 41059279

(51) Int. Cl.
*H04W 12/088* (2021.01)
*H04W 76/10* (2018.01)

(52) U.S. Cl.
CPC .......... *H04W 12/088* (2021.01); *H04W 76/10* (2018.02)

(58) Field of Classification Search
CPC .............................. H04W 12/088; H04W 76/10
See application file for complete search history.

(56) References Cited

U.S. PATENT DOCUMENTS

| | | | |
|---|---|---|---|
| 10,383,017 B2 * | 8/2019 | He | H04W 36/1443 |
| 10,917,290 B2 * | 2/2021 | Bedekar | H04L 47/80 |
| 11,116,029 B2 * | 9/2021 | Iwai | H04W 88/18 |
| 12,127,047 B2 * | 10/2024 | Lee | H04W 36/00692 |

(Continued)

FOREIGN PATENT DOCUMENTS

EP     3 481 140 A1     5/2019

OTHER PUBLICATIONS

International Search Report dated Feb. 5, 2024, issued in International Application No. PCT/KR2023/016043.

(Continued)

*Primary Examiner* — Viral S Lakhia
(74) *Attorney, Agent, or Firm* — Jefferson IP Law, LLP

(57)     ABSTRACT

The disclosure relates to a fifth generation (5G) communication system or a sixth generation (6G) communication system for supporting higher data rates beyond a fourth generation (4G) communication system such as long term evolution (LTE). A method performed by a core network entity 107 for selecting a selective security mode for applying selective security is provided. The method receives first information block from RAN 106. The first information block includes UE capability to support selective security and preferred selective security mode. Further, core network entity may determine if RAN and core network entity are capable of supporting the preferred selective security mode. Finally, the core network entity applies the preferred selective security on the one or more incoming data packets based on the encryption status of the incoming data packets, when at least one of RAN and core network entity supports the preferred selective security mode.

20 Claims, 20 Drawing Sheets

(56) References Cited

U.S. PATENT DOCUMENTS

| | | | | |
|---|---|---|---|---|
| 12,200,751 | B2* | 1/2025 | Kim | H04W 28/0278 |
| 2016/0364271 | A1 | 12/2016 | Burger et al. | |
| 2019/0387401 | A1* | 12/2019 | Liao | H04W 4/08 |
| 2020/0037165 | A1 | 1/2020 | Kunz et al. | |
| 2020/0100101 | A1 | 3/2020 | Torvinen et al. | |
| 2021/0168594 | A1 | 6/2021 | Wu et al. | |
| 2022/0086072 | A1 | 3/2022 | Chou et al. | |
| 2022/0132313 | A1 | 4/2022 | Lee et al. | |
| 2022/0232384 | A1* | 7/2022 | Muhanna | H04W 12/06 |
| 2022/0263700 | A1* | 8/2022 | Dabbs | H04W 56/001 |
| 2022/0286911 | A1* | 9/2022 | Howe | H04L 63/1425 |
| 2023/0013356 | A1* | 1/2023 | Vagelos | H04W 12/71 |
| 2023/0189058 | A1* | 6/2023 | Yeh | H04W 48/18 |
| | | | | 370/329 |
| 2023/0209399 | A1* | 6/2023 | Yu | H04W 28/04 |
| | | | | 455/414.1 |
| 2024/0114047 | A1* | 4/2024 | Tsai | H04L 63/1408 |
| 2024/0146794 | A1* | 5/2024 | Rossbach | H04L 65/756 |

OTHER PUBLICATIONS

Rajavelsamy R et al., Towards Performance Improvement of User Plane Traffic in Wireless System: Security Aspects, 2020 IEEE 17th Annual Consumer Communications & Networking Conference (CCNC), Jan. 10, 2020.
European Search Report dated Jul. 22, 2025, issued in European Application No. 23880174.0.

\* cited by examiner

Core Network Entity 107

Processor 205    I/O interface 207

Memory 209

Data 213

Information block data 215    Selective security mode data 217

Incoming packet data 219    Other data 221

Modules 211

Receiving module 223    Determining module 225

Selective security applying module 227    Other modules 229

300A

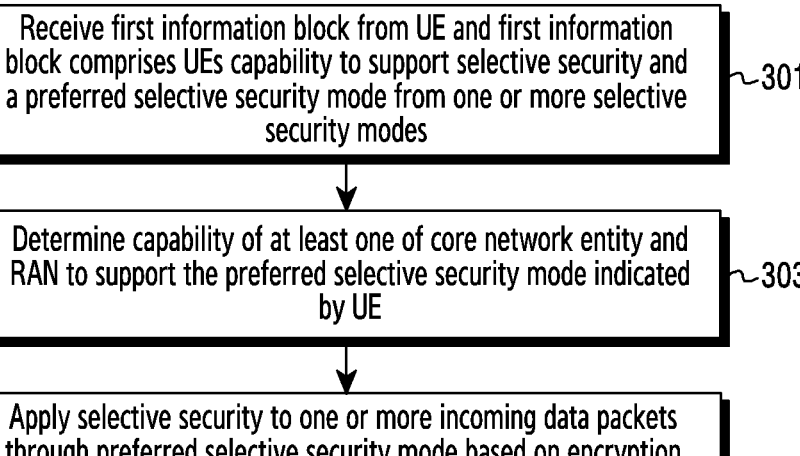

| Receive first information block from UE and first information block comprises UEs capability to support selective security and a preferred selective security mode from one or more selective security modes | ∿301 |

| Determine capability of at least one of core network entity and RAN to support the preferred selective security mode indicated by UE | ∿303 |

| Apply selective security to one or more incoming data packets through preferred selective security mode based on encryption status of one or more incoming data packets, when at least one of the core network entity and RAN are capable of supporting preferred selective security mode | ∿305 |

Determine encryption status of one or more incoming data packets of a data stream based on header information of corresponding one or more incoming data packets ~311

Transmit a data packet header corresponding to a first incoming data packet of the data flow, to the RAN, wherein the data packet header comprises ciphering information, and a single bit message indicates whether ciphering information for rest of the incoming packets is same as the ciphering information of the first incoming data packet to the RAN ~313

Apply selective security to each of the one or more incoming data packets of the data flow, through the RAN, based on the ciphering information ~315

| Transmit, by the core network entity, one or more incoming data packets to the RAN, wherein the RAN determines the encryption status of the one or more incoming data packets of a data flow based on header information of the corresponding one or more incoming data packets | ~321 |

| Apply the selective security to the one or more incoming data packets through the RAN, based on the encryption status of the one or more incoming data packets | ~323 |

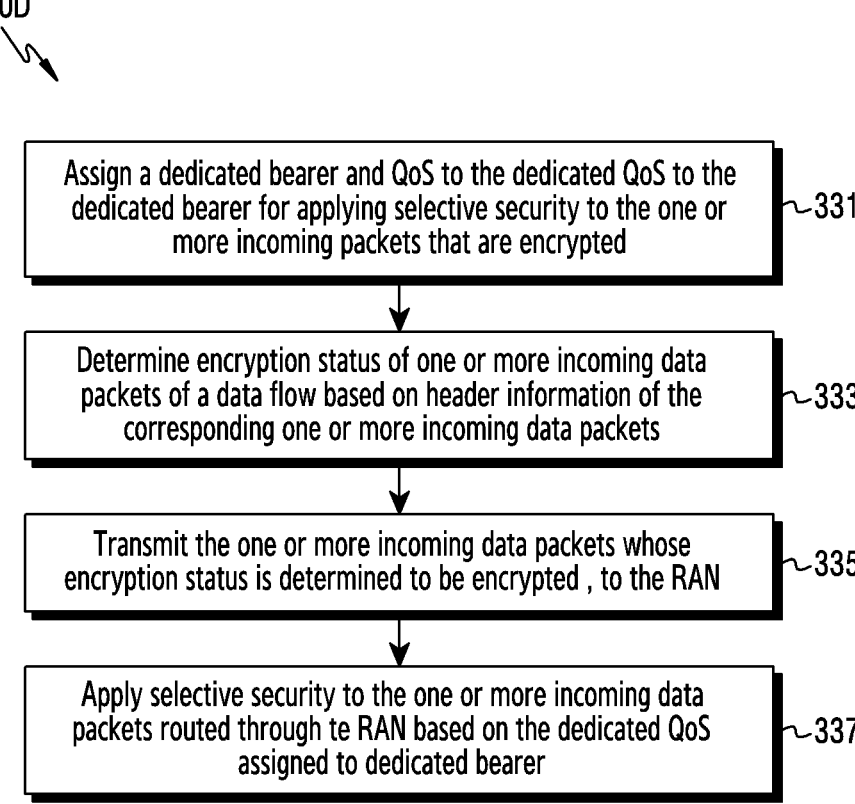

Assign a dedicated bearer and QoS to the dedicated QoS to the dedicated bearer for applying selective security to the one or more incoming packets that are encrypted ~331

Determine encryption status of one or more incoming data packets of a data flow based on header information of the corresponding one or more incoming data packets ~333

Transmit the one or more incoming data packets whose encryption status is determined to be encrypted , to the RAN ~335

Apply selective security to the one or more incoming data packets routed through te RAN based on the dedicated QoS assigned to dedicated bearer ~337

| Transmit a first information block received from UE to a core network entity associated with the RAN, wherein the first information block comprises at least one of an indication of UE's capability to support selective security, and a preferred selective security mode from one or more selective security modes | ~340 |

| When the preferred selective security mode is packet classification at UPF mode, receive a data packet header corresponding to a first incoming data packet of a data flow, and a single bit message indicating ciphering information of each of rest of incoming data packets of the data flow from the core network entity | ~341 |

| Apply selective security to each of the one or more incoming data packets of the data flow based on the ciphering information | ~343 |

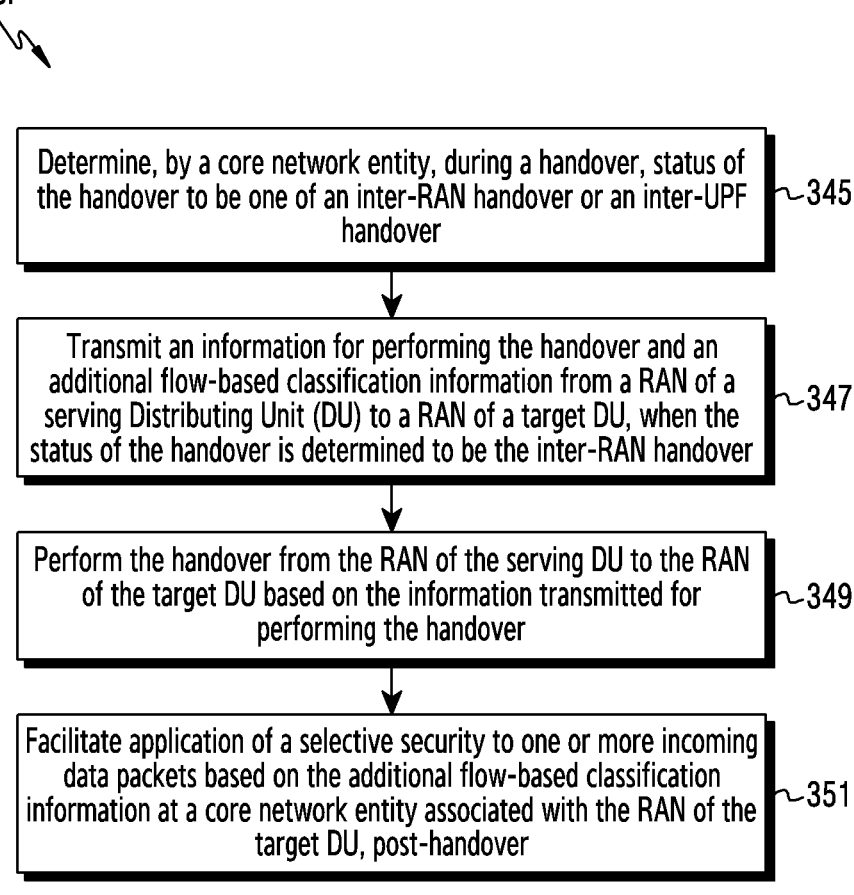

Determine, by a core network entity, during a handover, status of the handover to be one of an inter-RAN handover or an inter-UPF handover ⟶345

Transmit an information for performing the handover and an additional flow-based classification information from a RAN of a serving Distributing Unit (DU) to a RAN of a target DU, when the status of the handover is determined to be the inter-RAN handover ⟶347

Perform the handover from the RAN of the serving DU to the RAN of the target DU based on the information transmitted for performing the handover ⟶349

Facilitate application of a selective security to one or more incoming data packets based on the additional flow-based classification information at a core network entity associated with the RAN of the target DU, post-handover ⟶351

METHOD AND APPARATUS FOR SELECTING SELECTIVE SECURITY MODE AND FLOW MANAGEMENT IN A WIRELESS COMMUNICATION SYSTEM

CROSS-REFERENCE TO RELATED APPLICATION(S)

This application is based on and claims priority under 35 U.S.C. § 119(a) of an Indian Provisional patent application number 202241059279, filed on Oct. 17, 2022, in the Indian Intellectual Property Office, and of an Indian Non-Provisional patent application number 202241059279, filed on Sep. 25, 2023, in the Indian Intellectual Property Office, the disclosure of each of which is incorporated by reference herein in its entirety.

BACKGROUND

1. Field

The disclosure relates to a wireless communication system. More particularly, the disclosure relates to a method and apparatus for selecting a selective security mode for applying selective security and flow management for selective security for User Equipment (UE) under mobility.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in millimeter wave (mm-Wave) bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide method and apparatus for selecting selective security mode and flow management in a wireless communication system.

Additional aspects will be set forth in part in the description which follows and, in part, will be apparent from the description, or may be learned by practice of the presented embodiments.

In accordance with an aspect of the disclosure, a method of selecting a selective security mode for applying selective security is provided. The method includes receiving, by a core network entity, a first information block from the User Equipment (UE). The first information block includes at least one of an indication of UE's capability to support selective security, and a preferred selective security mode from one or more selective security modes. Further, the method includes determining, by the core network entity, capability of at least one of the core network entity and the Radio Access Network (RAN) to support the preferred selective security mode indicated by the UE. Finally, the method includes applying, by the core network entity, selective security to one or more incoming data packets through the preferred selective security mode based on an encryption status of the one or more incoming data packets. The selective security is applied when at least one of the core network entity and the RAN are determined to be capable of supporting the preferred selective security mode.

In accordance with another aspect of the disclosure, a core network entity for selecting a selective security mode for applying selective security is provided. The core network entity includes a processor and a memory communicatively coupled to the processor, wherein the memory stores processor instructions which, on execution, causes the processor to receive a first information block from the UE through a Radio Access Network (RAN) associated with a User Equipment (UE) and the core network entity. The first information block includes at least one of an indication of UE's capability to support selective security, and a preferred selective security mode from one or more selective security modes. Further, the processor determines capability of at least one of the core network entity and the RAN to support the preferred selective security mode indicated by the UE. Finally, the processor applies selective security to one or more incoming data packets through the preferred selective security mode based on an encryption status of the one or more incoming data packets, when at least one of the core network entity and the RAN are determined to be capable of supporting the preferred selective security mode.

In accordance with another aspect of the disclosure, a method of selecting a selective security mode for applying selective security is provided. The method includes transmitting, by a RAN, a first information block received from a User Equipment (UE), to a core network entity associated with the RAN. The first information block includes at least one of an indication of UE's capability to support selective security, and a preferred selective security mode from one or more selective security modes. The method further includes receiving, by the RAN, when the preferred selective security mode is packet classification at UPF mode, a data packet header corresponding to a first incoming data packet of one or more incoming data packets of the data flow. The data packet header includes ciphering information indicating an encryption status of the first incoming data packet and a length of un-ciphered headers in the first incoming data packet. Further, the method includes receiving, by the RAN, a single bit message indicating that the ciphering information of each of rest of the one or more incoming data packets of the data flow other than the first incoming data packet is same as the ciphering information of the first incoming data packet, for each data flow, from the core network entity. Further, the method includes, applying, by the RAN, the selective security to each of the one or more incoming data packets of the data flow based on the ciphering information.

In accordance with another aspect of the disclosure, a Radio Access Network (RAN) for selecting a selective security mode for applying selective security is provided. The RAN includes a processor and a memory communicatively coupled to the processor, wherein the memory stores processor instructions which, on execution, causes the processor to transmit a first information block received from a User Equipment (UE), to a core network entity associated with the RAN. The first information block includes at least one of an indication of UE's capability to support selective security, and a preferred selective security mode from one or more selective security modes. Further, the processor of the RAN receives when the preferred selective security mode is packet classification at UPF mode, a data packet header corresponding to a first incoming data packet of one or more incoming data packets of the data flow. The data packet header includes ciphering information indicating an encryption status of the first incoming data packet and a length of un-ciphered headers in the first incoming data packet. Further, the processor of the RAN receives a single bit message indicating that the ciphering information of each of rest of the one or more incoming data packets of the data flow other than the first incoming data packet is same as the ciphering information of the first incoming data packet, for each data flow, from the core network entity. Further, the processor of the RAN applies the selective security to each of the one or more incoming data packets of the data flow based on the ciphering information.

In accordance with another aspect of the disclosure, a method of flow management for selective security during the handover is provided. The method includes determining, by a core network entity, during a handover, status of the handover to be one of an inter-RAN handover or an inter-UPF handover. Thereafter, the method includes transmitting, by the core network entity, an information for performing the handover and an additional flow-based classification information from a RAN of a serving Distributing Unit (DU) to a RAN of a target DU, when the status of the handover is determined to be the inter-RAN handover. Further, the method includes performing, by the core network entity, the handover from the RAN of the serving DU to the RAN of the target DU based on the information transmitted for performing the handover. Subsequently, the method includes facilitating, by the core network entity, application of a selective security to one or more incoming data packets based on the additional flow-based classification information at a core network entity associated with the RAN of the target DU, post-handover.

In accordance with another aspect of the disclosure, a core network entity for flow management for selective security during the handover is provided. The core network entity includes a processor and a memory communicatively coupled to the processor, wherein the memory stores processor instructions which, on execution, causes the processor to determine during a handover, status of the handover to be one of an inter-RAN handover or an inter-UPF handover. The processor of the core network entity, then transmits an information for performing the handover and an additional flow-based classification information from a RAN of a serving Distributing Unit (DU) to a RAN of a target DU, when the status of the handover is determined to be the inter-RAN handover. Further, the processor of the core network entity, performs the handover from the RAN of the serving DU to the RAN of the target DU based on the information transmitted for performing the handover. Subsequently, the processor of the core network entity facilitates application of a selective security to one or more incoming data packets based on the additional flow-based classification information at a core network entity associated with the RAN of the target DU, post-handover.

In accordance with another aspect of the disclosure, a method of flow management for selective security during the handover is provided. The method includes determining, by a core network entity, during a handover, status of the handover to be one of an inter-RAN handover or an inter-UPF handover. Thereafter, the method includes transmitting, by the core network entity, an information for performing the handover and an additional flow-based classification information from a UPF associated with the RAN of the serving DU to a UPF associated with the RAN of the target DU, when the status of the handover is determined to be the inter-UPF handover. Further, the method includes performing, by the core network entity, the handover from the UPF associated with the RAN of the serving DU to the UPF associated with the RAN of the target DU based on the information transmitted for performing the handover. Subsequently, the method includes facilitating application of a selective security to one or more incoming data packets based on the additional flow-based classification information at a core network entity associated with the RAN of the target DU, post-handover.

In accordance with aspect of the disclosure, a core network entity for flow management for selective security during the handover is provided. The core network entity includes a processor and a memory communicatively coupled to the processor, wherein the memory stores processor instructions which, on execution, causes the processor to determine during a handover, status of the handover to be one of an inter-RAN handover or an inter-UPF handover. The processor of the core network entity, then transmits an information for performing the handover and an additional flow-based classification information from a UPF associated with the RAN of the serving DU to a UPF associated with the RAN of the target DU, when the status of the handover is determined to be the inter-UPF handover. Further, the processor of the core network entity, performs the handover the UPF associated with the RAN of the serving DU to the UPF associated with the RAN of the target DU based on the information transmitted for performing the handover. Subsequently, the processor of the core network entity facilitates application of a selective security to one or more incoming data packets based on the additional flow-based classification information at a core network entity associated with the RAN of the target DU, post-handover.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

6

Figure 1A:
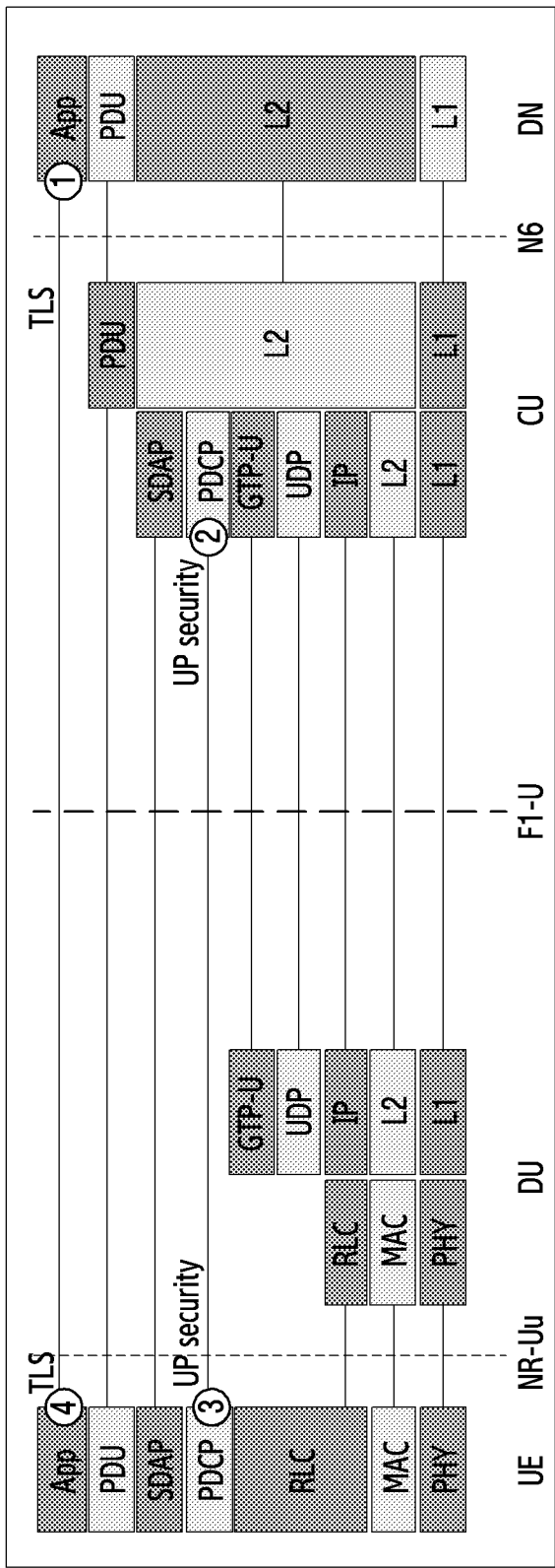
FIG. 1A illustrates a flow diagram depicting a duplicated security of application data, according to the related art.
Figure 1B:
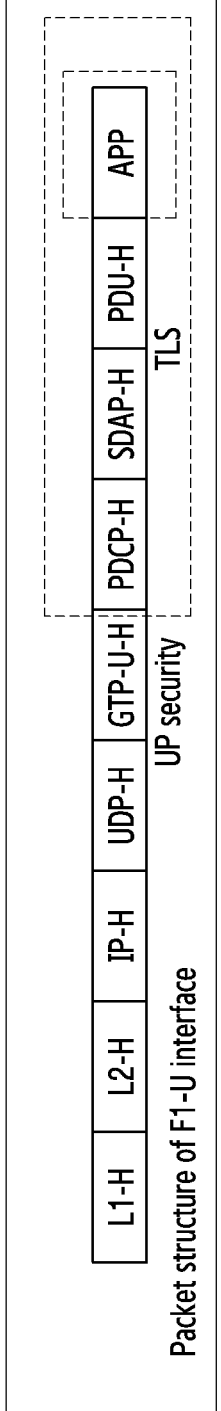
FIG. 1B illustrates a flow diagram depicting a duplicated security in F1-U, according to the related art.
Figure 1C:
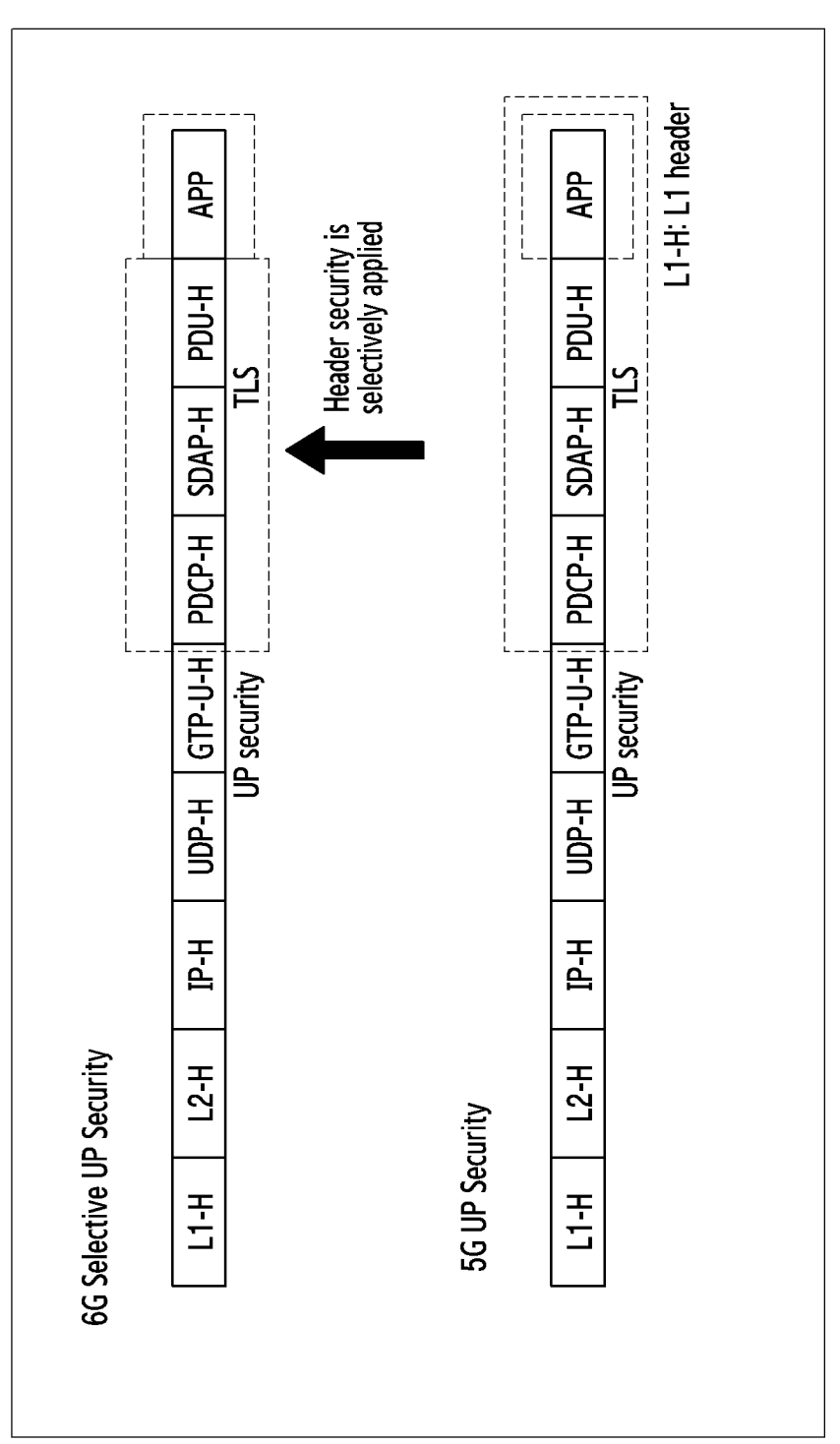
FIG. 1C illustrates comparison between 6G selective UP security and 5G UP security. according to the related art.
Figure 1D:
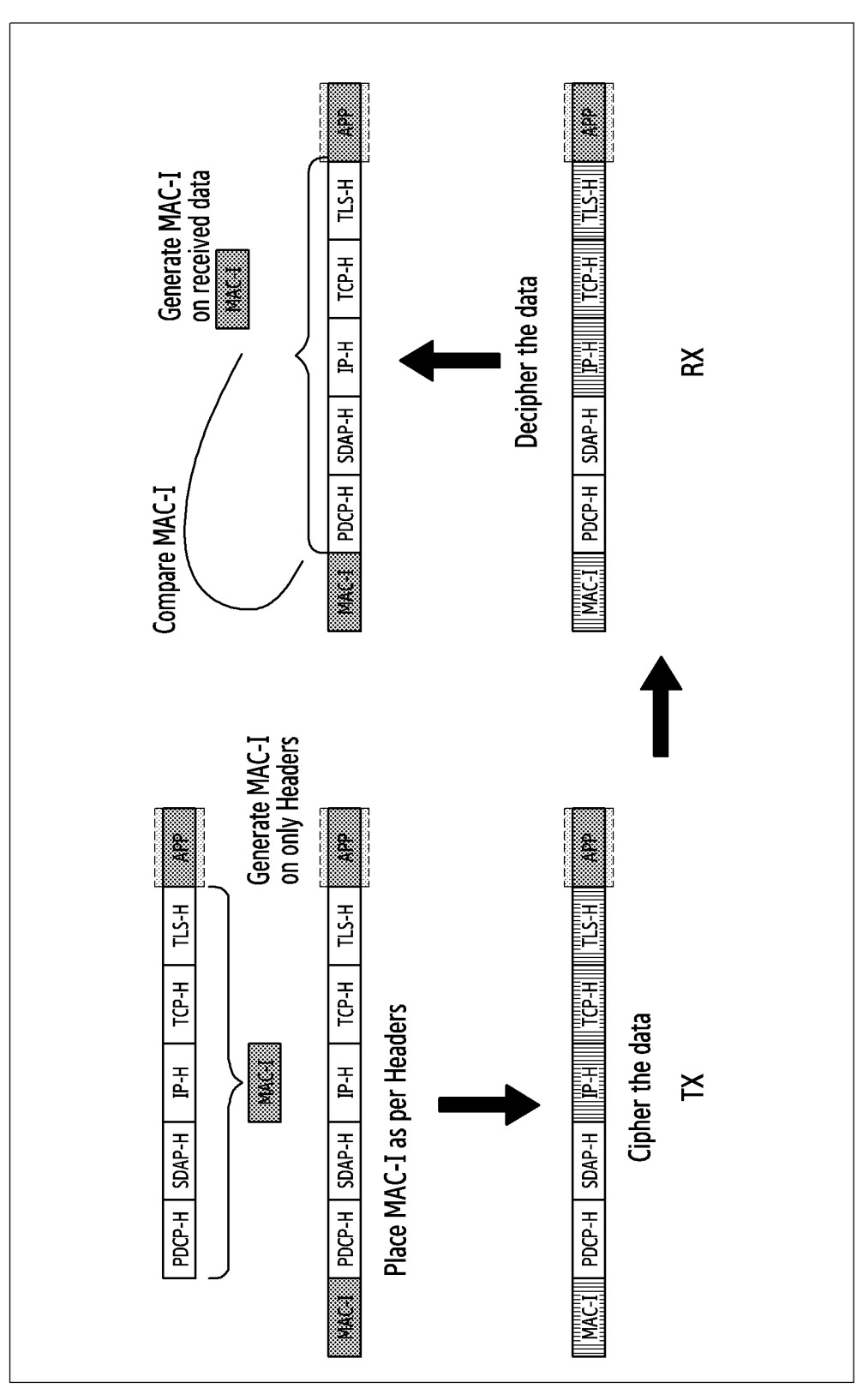
Figure 1E:
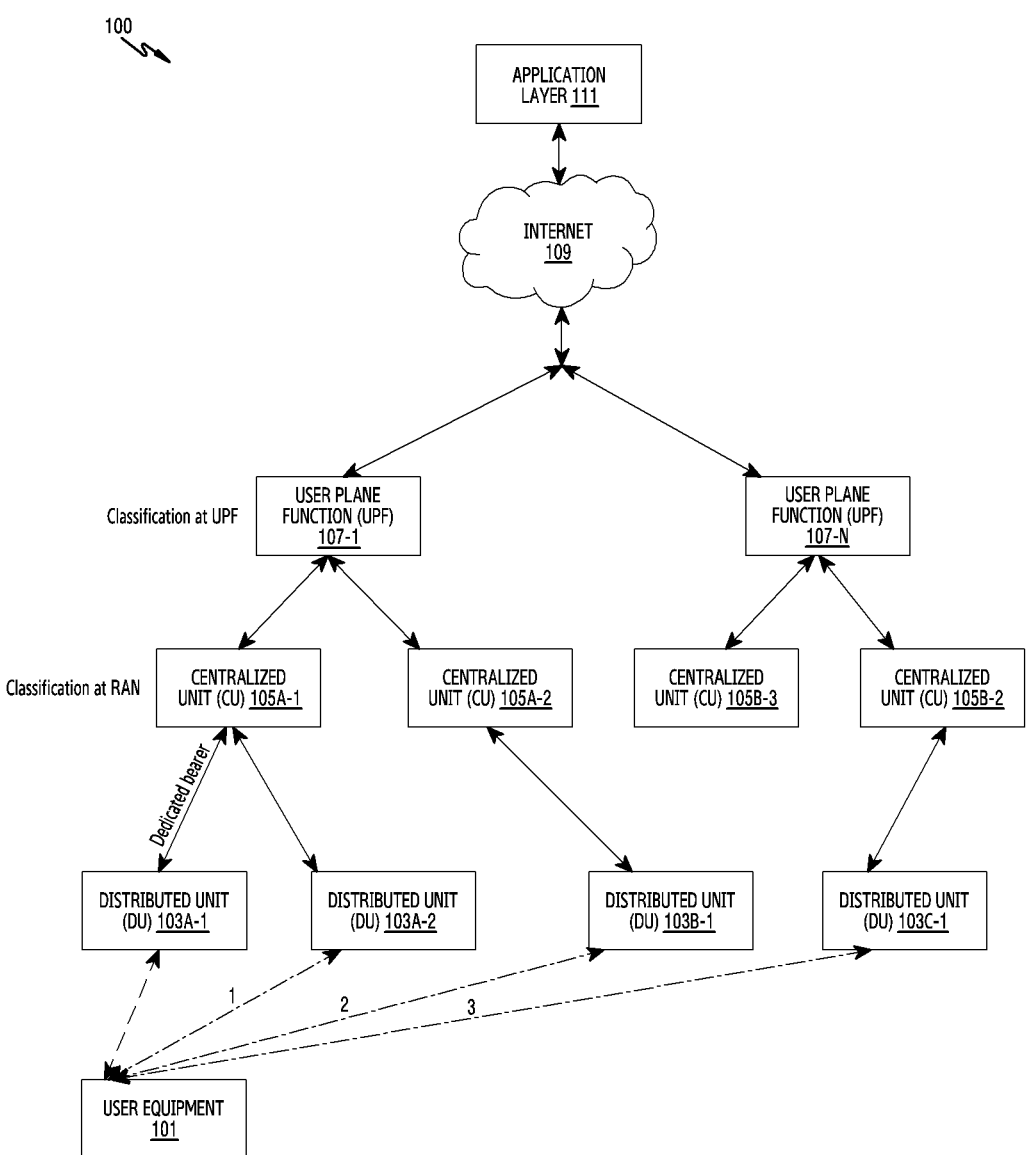
Figure 1F:
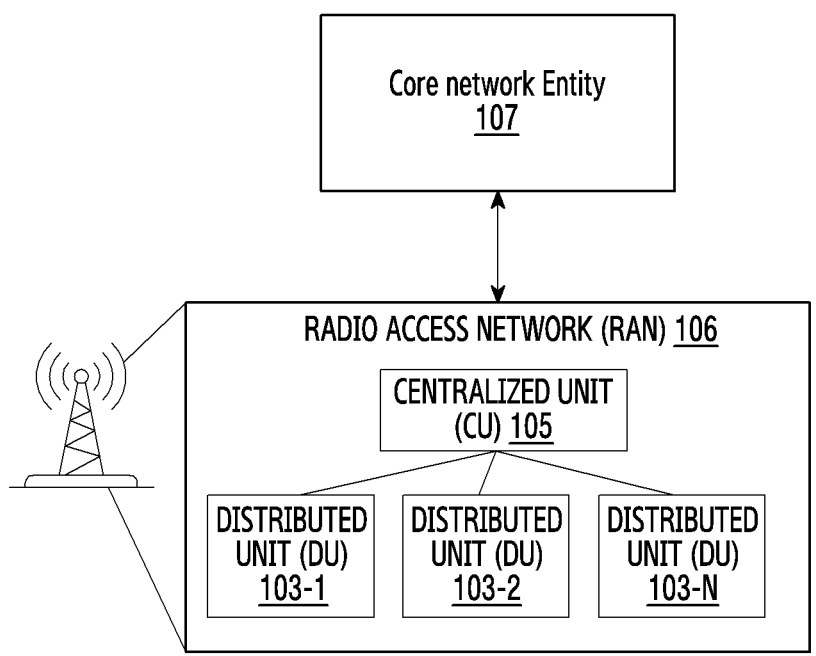
Figure 2A:
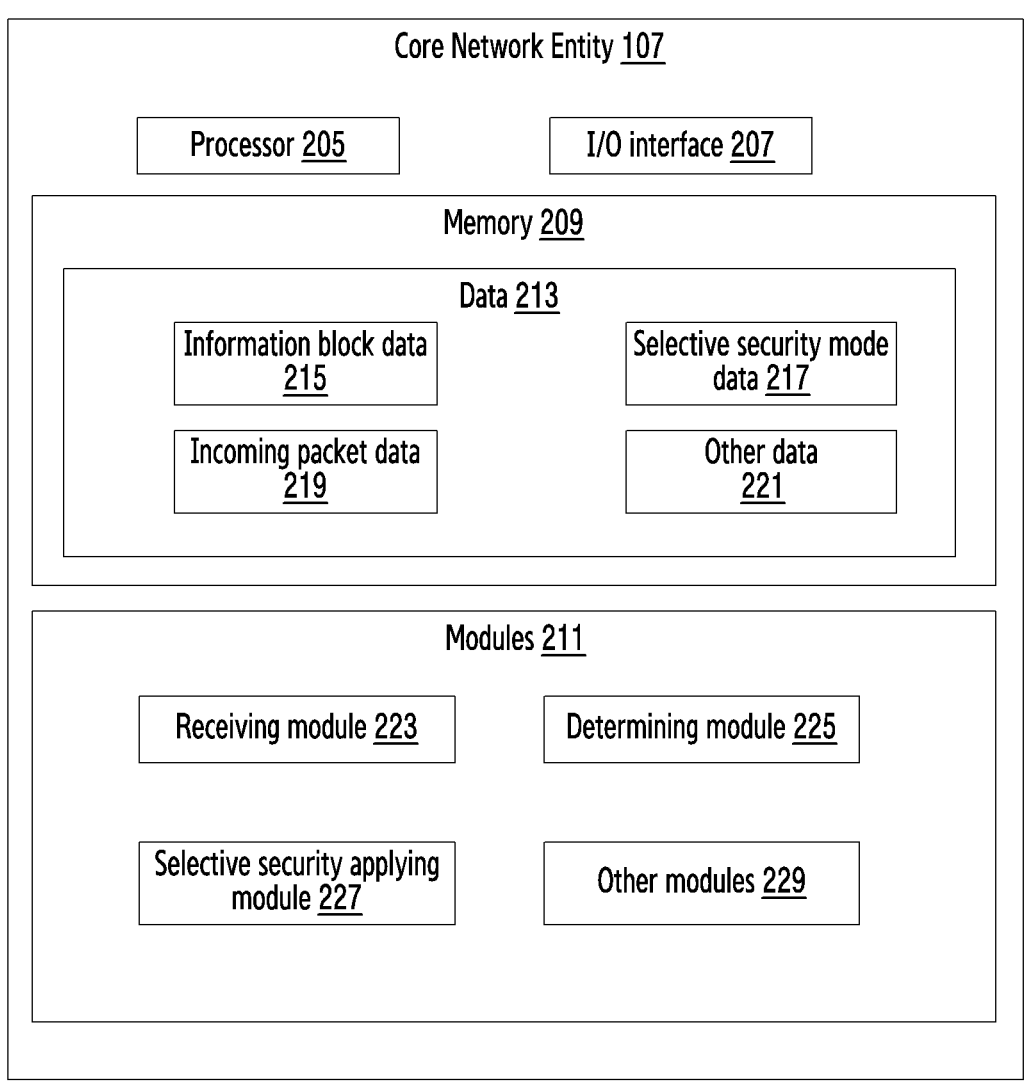
Figure 2B:
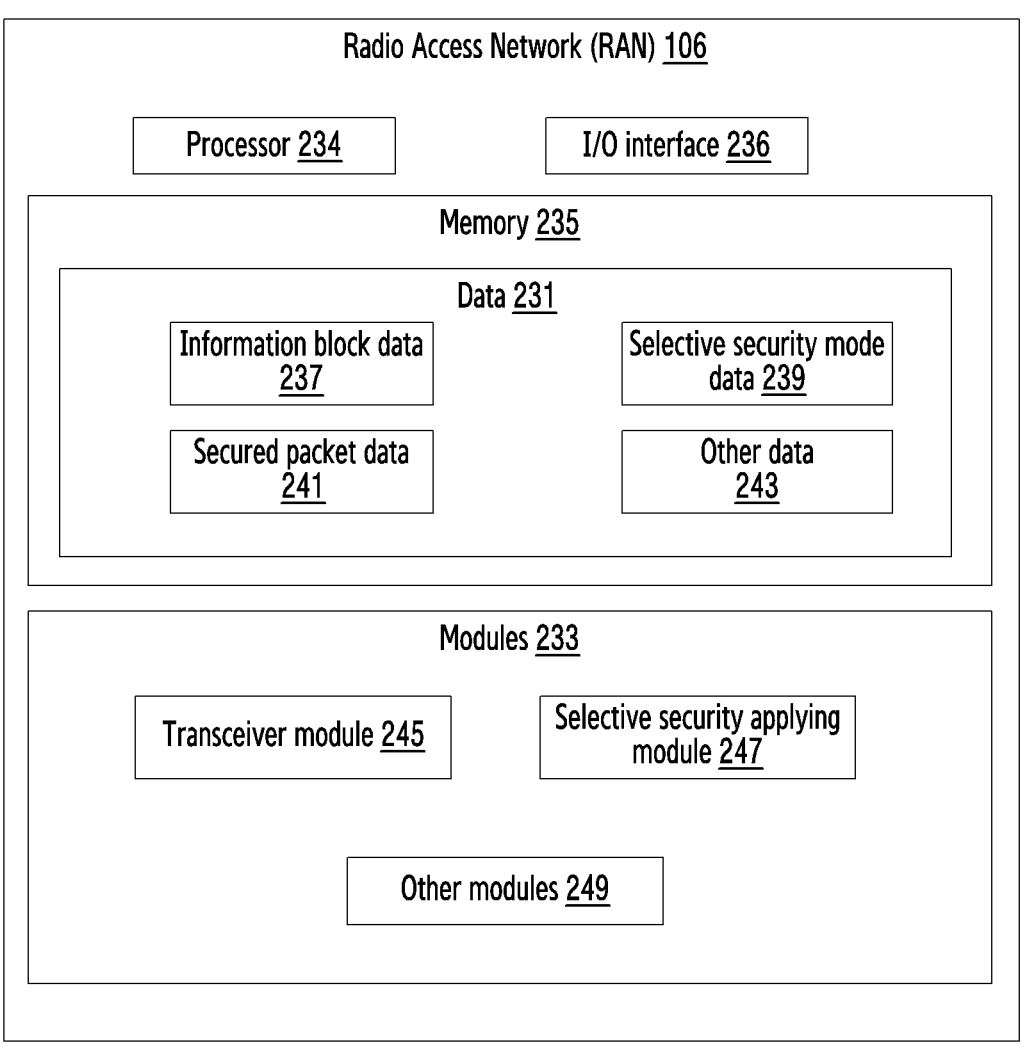
Figure 2C:
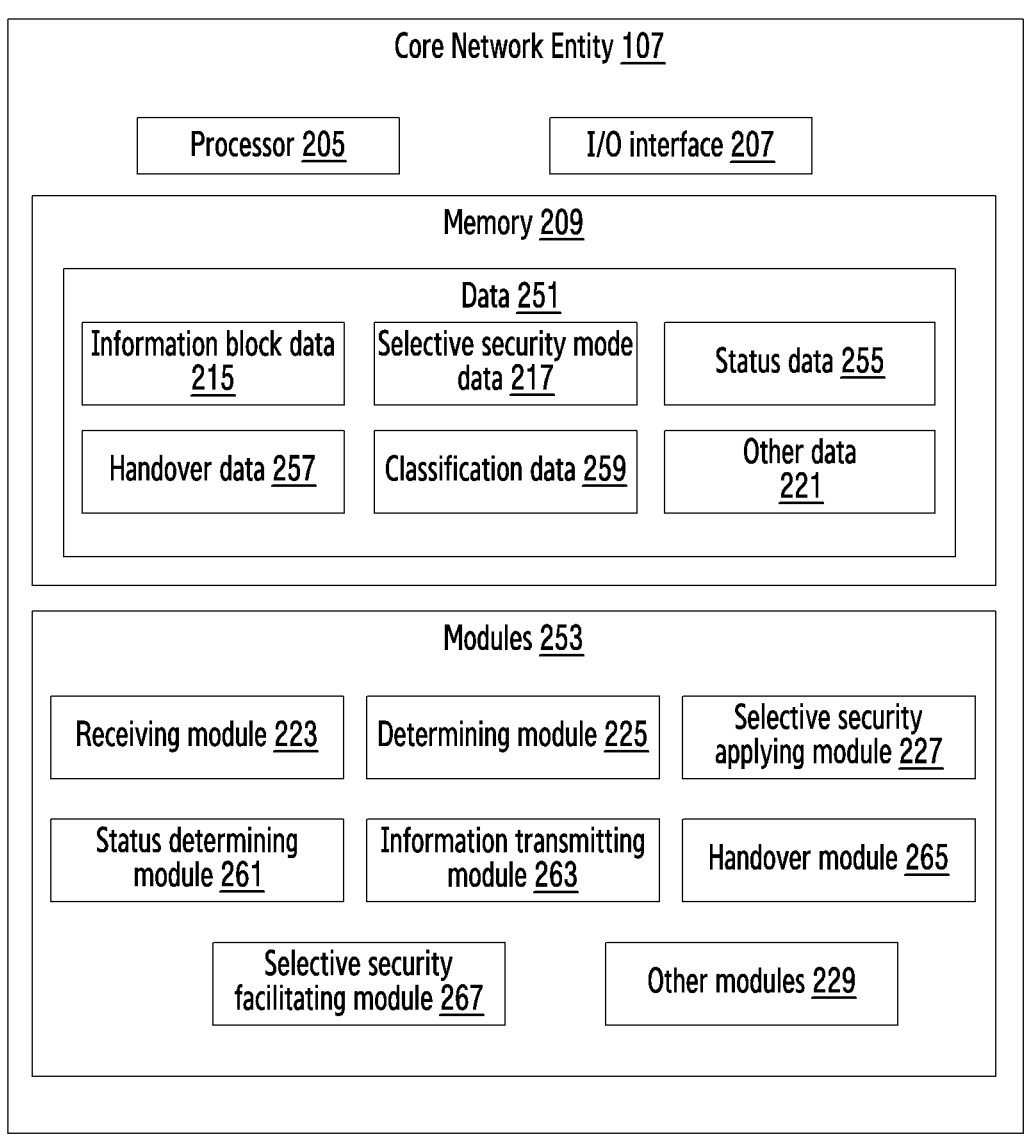
Figure 3G:
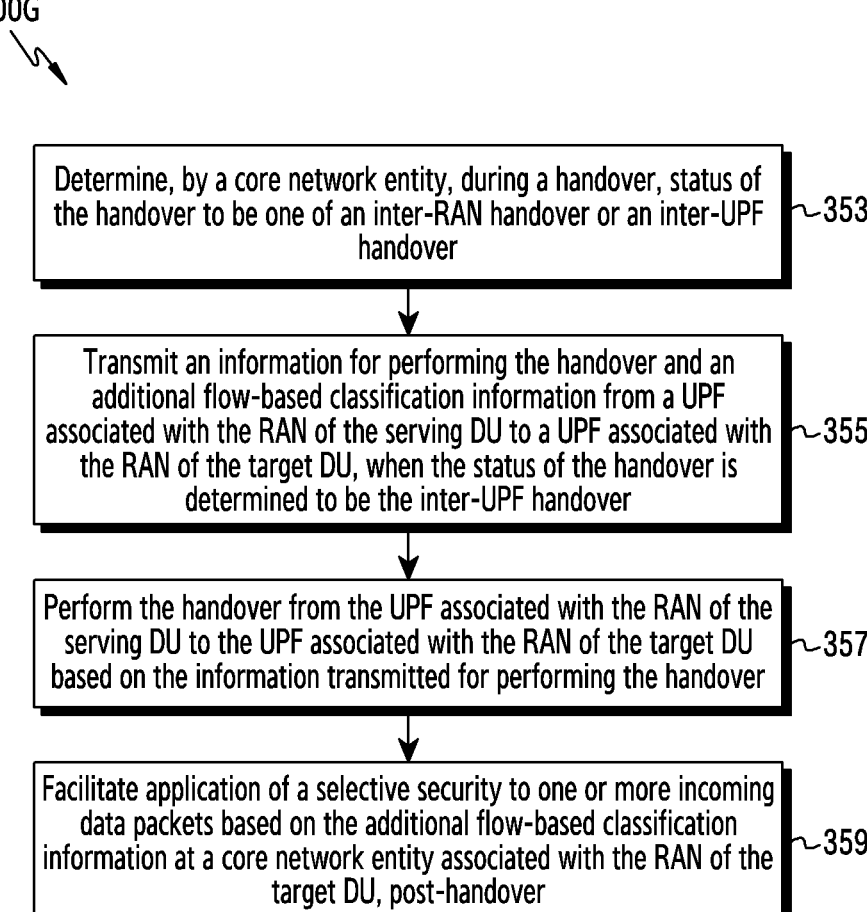
Figure 4:
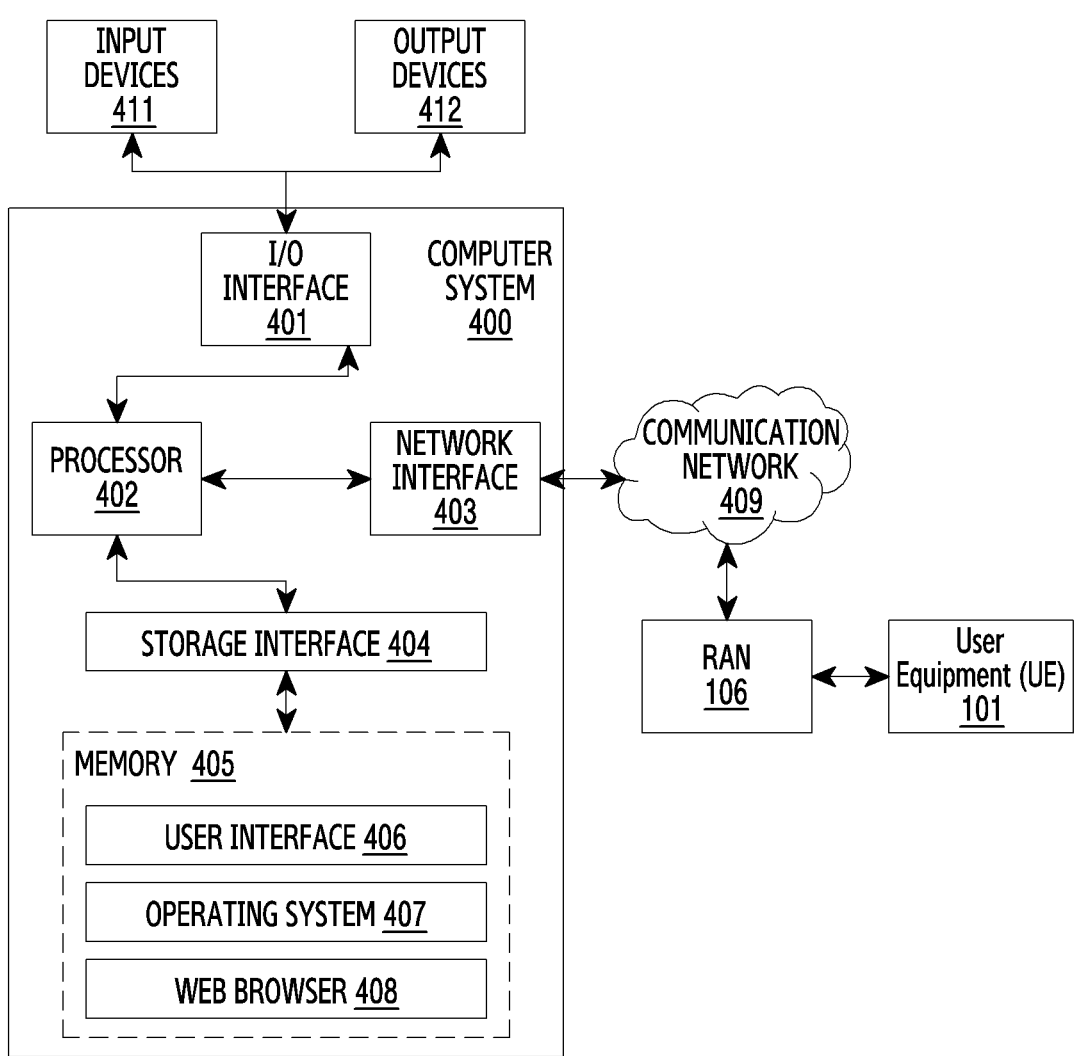
Figure 5:
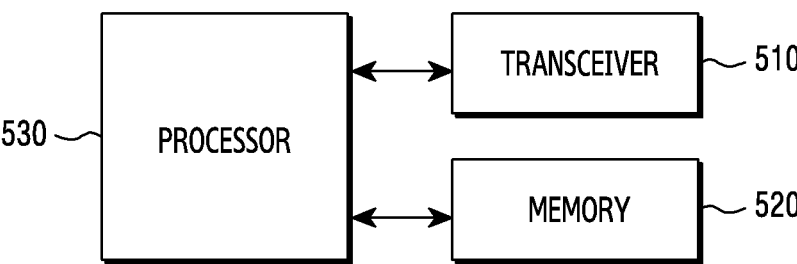
Figure 6:
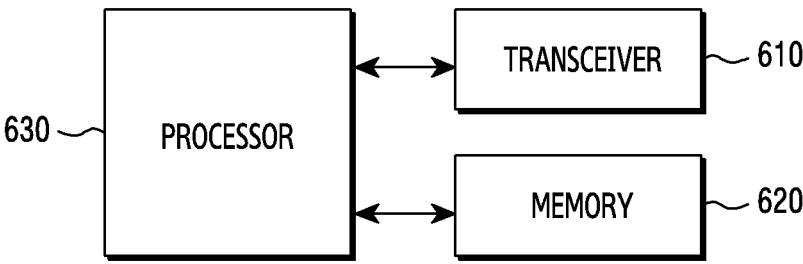
Figure 7:
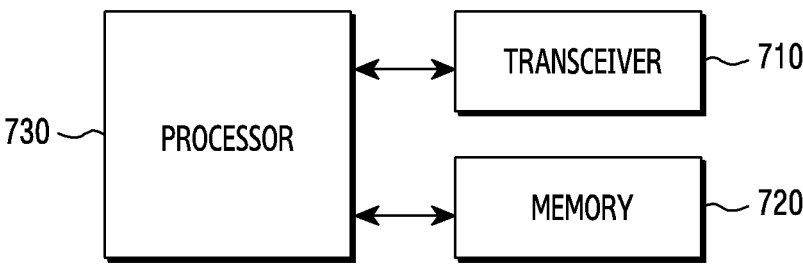

FIG. 1D illustrates a flow diagram depicting a method for selective user plane (UP) security in 6G communication, according to the related art;

FIG. 1E shows a system architecture for selecting security mode for applying selective security, according to an embodiment of the disclosure;

FIG. 1F shows a Radio Access Network (RAN) and its elements, according to an embodiment of the disclosure;

FIG. 2A shows a detailed block diagram of a core network entity for selecting security mode for applying selective security, according to an embodiment of the disclosure;

FIG. 2B shows a detailed block diagram of a Radio Access Network (RAN) for selecting security mode for applying selective security, according to an embodiment of the disclosure;

FIG. 2C shows a detailed block diagram of a core network entity for flow management for selective security during the handover, according to an embodiment of the disclosure;

FIG. 3A is a flowchart illustrating a method of selecting security mode for applying selective security, according to an embodiment of the disclosure;

FIG. 3B is a flowchart illustrating a method of applying selective security when the preferred selective security mode is classification at UPF, according to an embodiment of the disclosure;

FIG. 3C is a flowchart illustrating a method for applying selective security when the preferred selective security mode is selected as classification at RAN, according to an embodiment of the disclosure;

FIG. 3D shows a flowchart illustrating a method for applying selective security when the preferred selective security mode is a dedicated bearer according to an embodiment of the disclosure;

FIG. 3E shows a flowchart illustrating a method for selecting security mode for applying selective security, from a RAN perspective, when the preferred selective security mode is a packet classification at UPF mode, according to an embodiment of the disclosure;

FIG. 3F shows a flowchart illustrating a method of flow management for selective security mode for applying selective security, from an inter-RAN handover perspective, according to an embodiment of the disclosure;

FIG. 3G shows a flowchart illustrating a method of flow management for selective security mode for applying selective security, from an inter-UPF handover perspective according to an embodiment of the disclosure;

FIG. 4 is a block diagram of a computer system for implementing embodiments consistent according to an embodiment of the disclosure;

FIG. 5 is a block diagram illustrating a structure of a UE according to an embodiment of the disclosure;

FIG. 6 is a block diagram illustrating a structure of a base station according to an embodiment of the disclosure; and FIG. 7 is a block diagram illustrating a structure of a network entity according to an embodiment of the disclosure.

Throughout the drawings, it should be noted that like reference numbers are used to depict the same or similar elements, features, and structures.

BEST MODE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In recent years, several broadband wireless technologies have been developed for providing better applications and services to meet growing requirements of broadband subscribers. Second generation (2G) wireless communication system has been developed to provide voice services while ensuring mobility of users. Third generation (3G) wireless communication system supports not only the voice service but also data service. In recent years, fourth generation (4G) wireless communication system has been developed to provide high-speed data service. However, currently, the fourth generation (4G) wireless communication system suffers from a lack of resources to meet the growing demand for high-speed data services. This problem is solved by deployment of fifth generation (5G) wireless communication system to meet the ever-growing demand for high-speed data services. Furthermore, the fifth-generation (5G) wireless communication system provides ultra-reliability and supports low latency applications. For the next generation of wireless communication systems i.e., 6G, various technologies have been under consideration. The technologies may be Visible Light Communication (VLC), Terahertz band (THz) i.e., frequencies from 100 GHz to 3 THz, infrared wave, and ultraviolet wave, etc. Among all these technologies, the THz band is envisioned as a potential technology for a diverse range of applications, which exist within nano, micro as well as macro scales. The various features of the THz band are that it may provide Terabits per second (TBPS) data rates, reliable transmission, and minimal latency. Frequencies from 100 GHz to 3 THz are promising bands for next generation of wireless communication systems because of the wide range of the unused and unexplored spectrum. As per the literature available for THz band communication system these frequencies also offer the potential for revolutionary applications in the realm of devices, circuits, software, signal processing, and systems. The ultra-high data rates facilitated by mmWave, and THz wireless local area and cellular networks enable super-fast download speeds for computer communication, autonomous vehicles, robotic controls, information shower, high-definition holographic gaming, entertainment, video conferencing, and high-speed wireless data distribution in data centers. In addition to the extremely high data rates, there are promising applications for future mmWave and THz systems that are likely to evolve in 6G networks, and beyond.

In general, with the advancement in the field of wireless communication systems, a peak data rate in range of Gigabits per second (Gbps) is possible with the THz and high mmWave frequency. Further, the requirement of peak data rate throughput in future wireless communication systems may go easily beyond 100 Gbps. Further, new requirements beyond 5G and above like reduced Transmission Time Interval (TTI) boundaries or huge packet sizes are needed to support increased data throughput with improved data path protocol design of wireless communication systems. It is also expected that the new generation of protocols will also serve the users at a very high speed or mobility.

Current fifth generation New Radio (5G NR) wireless communications system are capable of supporting a peak cell throughput of about 10s of Gbps with per user peak data rate of couple of Gbps. The requirement of peak per user data rate throughput in future wireless communication systems may go easily beyond 100 Gbps, with advancement in radio access technology by exploring further higher bandwidths beyond 100 GHz. The given channel characteristics for the terahertz frequency and with increased subcarrier spacing, the TTI duration for the system to be supported will further reduce to very few microseconds to few 100s of nanoseconds. Also, enhancements in higher level protocols may imply packet size to increase to huge sizes to support such high throughput. With such an increased data throughput and/or reduced TTI boundaries and/or jumbo packet sizes, there is a need to strengthen the modem protocol design to sustain and support these new requirements for beyond 5G systems. Thus, there is need for various methods by which the protocol design can be changed to support these new requirements.

The current state-of-the art multi-core processors are capable of supporting New Radio (NR) data throughput requirements. A typical quad-core system (enabled with few HardWare Accelerators (HWA) like ciphering engine, header parser, etc.) is used for a New Radio (NR) mobile handset and can support couple of Gbps Transmission Control Protocol (TCP) application on a modem protocol stack including data plane processing units like Packet Data Convergence Protocol (PDCP), Radio Link Control (RLC) and Medium Access Control (MAC). An important aspect of PDCP layer is ciphering and deciphering (encryption) of user plane and control plane data. Along with encryption of packets, the PDCP layer also supports integrity protection and integrity verification for user plane and control plane data. The User plane data is the data belonging to all the user application traffic, while the control plane data is related to signaling messages originating within RAN for Radio Resource Configuration (RRC) and Non Access Stratum (NAS) messages shared between Base Station (gNodeB) (gNB) and a User Equipment (UE). While integration and ciphering for control plane is by default enabled and supported to comply with secure messages getting exchanged, both the functions of ciphering and integrity are optional features for data plane processing. Encryption ciphering is basically classified as block cipher or stream cipher. Most of the encryption algorithm implemented under RAN protocol are Block ciphering algorithm where messages are converted into fixed-size blocks before converting them into encrypted message using private key known and configured at RAN. Such software operations for larger size packets take a lot of processing cycles in terms of central processing unit (CPU) utilization. With increasing nature of security threats and techniques being discovered to hack any security or perform any kind of cryptanalysis, it is necessary that security of the data over wireless network is not compromised at any cost even if takes large number of CPU cycles. The current CPU utilization analysis indicates that further increasing in the throughput mostly force to bottleneck. With ever increasing demand to increase the throughput and to meet the throughput in real time, there is a need to address the CPU cycles required for any functionality within the data plane processing part. A good enough amount of saving for security will also lead to reduce energy consumption and power savings in certain aspects leading to greener impacts of future technologies. However, security is something which cannot be compromised.

Securing data over wireless connection is of utmost importance to avoid any man-in-the-middle attack or any spurious User Equipment (UE) trying to connect to the Network (NW) or detect a fake gNB to guarantee secure connection and services to the UE. Data exchanged over wireless network can never be compromised as it can have far reaching effect on privacy issues. With many applications and information being exchanged like banking, social media profiles, chats, video streams and others, there are many security policies in place at each layer in the end-to-end protocol stack. In the Open Systems Interconnect (OSI) model, there is security mechanisms embedded in each of the layers either at Application Layer, Transport Layer, Internet Protocol Layer, Data Link Layer or the Physical Layer. Hence, duplicate security already exists across multiple protocol layers at various hierarchy across the end-to-end protocol. For example, Application Data is encrypted using TLS (Transport Layer Security). On top of which the Packet Data Convergence Protocol (PDCP) layer applies its user plane security from RAN perspective. The NR PDCP layer supports integrity protection of data. It generates a MAC-I for the entire payload including protocol headers. Further, the PDCP Payload and the MAC-I generated is ciphered or encrypted to protect the data received for that UE.

FIG. 1A illustrates a flow diagram depicting a duplicated security of application data, according to the related art.

Multiple levels of security at various levels exist across end-to-end Protocol stack. Duplicate functionality of security adds an extra overhead in terms of encrypting already encrypted data. Thus, there is a possibility of optimization of data by removing any duplicate security of the application data and security to be applied only to Protocol layers wherever applicable.

FIG. 1B illustrates a flow diagram depicting a duplicated security in F1-U, according to the related art.

The packet structure of F1-U interface includes L1-H, L2-H, IP-H, UDP-H, GTP-U_H, PDCP-H, SDAP-H, PDU-H, and App. Duplicated security in F1-U is done via IP security. Already encrypted data is doubly secured, which can be avoided to fasten the processing and achieve the 6G specific targets for future applications. F1U data is also IPSec protected between the CU-DU split architecture to secure the IP connection between CU and DU. Hence, Also, there is multiple levels of security already applied which brings redundancy in terms of the operations related to security. Thus, there is a scope to avoid duplicate security of already encrypted data by applying Selective Integrity and Selective Security. Reducing on the processing required to apply security, it is possible to save on certain CPU complexity and hence increase the throughput to meet beyond 5G or 6G demands. Security implementation on the NW processors is implemented using software, while security implementations on the UE processors is implemented using specific dedicated Hardware Accelerators (HWA) or Security Accelerators (SA). Reducing the CPU complexity of security may help in power saving as well as give scope to increase throughput. In cases, where Security Accelerators are used, it can lead to cost and power savings as SA complexity can be reduced dramatically. This also leads to multiple possibilities and methods to reduce any possible overheads in terms of complexity related to security-integrity protection and ciphering.

FIG. 1C illustrates comparison between 6G selective UP security and 5G UP security according to the related art.

The selective UP security enhances the throughput of Packet Data Convergence Protocol (PDCP). User Plane Function (UPF) determines whether new Internet Protocol (IP) flow is encrypted after inspecting packets. Also, header security is selectively applied if application security is applied, where the security of header information is applied without encrypting the application data. The enhanced throughput in PDCP layer is required since most of data are video Over the Top (OTT), web and Social Networking Service (SNS) are in the encrypted form.

FIG. 1D illustrates a flow diagram depicting a method for selective user plane (UP) security in 6G communication, according to the related art.

In the existing techniques, it is possible to avoid duplicate security by not applying encryption for already encrypted data. This is possible by identifying the length of all the intermediate headers which are not encrypted typically in the IP header, transport layer header and security information header. Further, PDCP can determine the header lengths either by parsing individual header like IP, transport and security. Optionally, higher layers or modules at core network or higher layers in Radio Access Networks (RAN) Service Data Adaption Protocol (SDAP) may determine the length and inform the PDCP layer. A fixed length can also be assumed as a static configuration for a PDCP layer to determine the length of the portion for ciphering. Also, the fixed length can be calculated as Max of IP Header+ Transport Headers+Security Headers. Furthermore, it is possible that under such consideration some portion of the application data is also ciphered. Radio Resource Control (RRC) can configure the fixed header length per Data Radio Bearer (DRB) under such configuration. All the IP data packets of a flow which satisfies the condition for security can be mapped to this DRB. Optionally, Core Network or higher layers can optionally indicate the length of the portion of the received SDU to be ciphered or integrity protected. A selective user plane security needs to understand the packet IP flow, as the packet headers in order to decide how correctly to cipher the headers present in the packet. Also, it is possible that due to mobility, different configurations can be supported in multiple cells. Hence, there is a need to efficiently manage the security aspects during mobility especially when the profile for security can be dynamic in nature. This disclosure provides details about the various aspects required in the handling of the security state for the PDCP module and also provide the feature for mobility.

In the document, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The disclosure relates to a method and apparatus for selecting a selective security mode for applying selective security and flow management for selective security for User Equipment (UE) under mobility. Initially, a core network entity may receive a first information block from a User Equipment (UE), through a Radio Access Network (RAN) which is associated with the UE and the core network entity. The core network entity may be any control plane function entity. As an example, one of the control plane functionality is a User Plane Function (UPF) which may receive the first information block during the session establishment between the UE and the UPF. The disclosure is explained in terms of UPF as the control plane functionality. However, this should not be construed as a limitation of the disclosure as it is possible to implement the functionalities of the core network entity through any control plane function entity other than UPF. The first information block comprises at least one of an indication whether the UE is capable of supporting the selective security and a preferred selective security mode from the one or more selective security modes. The one or more selective security modes may include, but not limited to, packet classification at UPF mode, packet classification at RAN mode and a dedicated bearer mode. The preferred selective security mode is a selective security mode supported or preferred by the UE. In an embodiment, the core network entity may also receive a second information block from RAN during a Protocol Data Unit (PDU) session establishment between the UE and the core network entity. The second information block comprises an indication of whether the RAN is capable of supporting one or more selective security modes. Further, the core network entity may determine if at least one of the core network entity or the RAN are capable of supporting the preferred selective security mode indicated by the UE. Finally, the core network entity may apply the selective security to the one or more incoming data packets through the preferred selective security mode based on the encryption status of the one or more incoming data packets.

Therefore, the disclosure enables the UE to select the preferred selective security mode based on the capability and requirement of the UE. Secondly, based on the preferred selective security mode, the packet classification i.e., whether an incoming data packet is encrypted or unencrypted is determined either at the UPF or at the RAN. The method of classifying the packets at the UPF disclosed in the disclosure enables indicating whether the packets of a data flow are encrypted or unencrypted, and also information regarding the ciphering length, using a single bit message for the entire data flow. Thus, the disclosure enables in lesser data transmission between UPF and RAN to convey the packet classification and ciphering information related details, which leads to efficient usage of available bandwidth. Moreover, due to the packet classification being performed at the UPF or the RAN, the network overhead on the RAN for applying selective security is reduced, which in turn reduces delays and the time taken to perform the selective security process. Therefore, overall, of the disclosure improves the network performance and reduces the overhead in the network with respect to selective security procedure.

Further, when the UE has to undergo handover, the disclosure provides a method and apparatus for flow management for the selective security during such handover. During the handover, the core network entity may determine status of the handover to be one of an inter-RAN handover or an inter-UPF handover. In some embodiments, when the status of the handover is determined to be the inter-RAN handover, the core network entity may transmit an information for performing the handover and an additional flow-based classification information from a RAN of a serving Distributing Unit (DU) to a RAN of a target DU. Thereafter, the core network entity performs the handover from the RAN of the serving DU to the RAN of the target DU based on the information transmitted for performing the handover. Upon performing the handover, the core network entity may facilitate application of a selective security to one or more incoming data packets based on the additional flow-based classification information at a core network entity associated with the RAN of the target DU. However, in another embodiment, when the status of the handover is determined to be the inter-UPF handover, the core network entity may transmit an information for performing the handover and an additional flow-based classification information from a UPF associated with the RAN of the serving DU to a UPF associated with the RAN of the target DU. Thereafter, the core network entity may perform a handover from the UPF associated with the RAN of the serving DU to the UPF associated with the RAN of the target DU based on the information transmitted for performing the handover. Upon performing the handover, the core network entity may facilitate application of a selective security to one or more incoming data packets based on the additional flow-based classification information at a core network entity associated with the RAN of the target DU.

The disclosure enables transmitting additional flow based classification information during a handover. This in turn enables the core network entity associated with the RAN of the target DU or the RAN of the target DU to continue the classification of the data packets as per the preferred selective security mode and application of the selective security thereafter, in a lossless manner.

A description of an embodiment with several components in communication with each other does not imply that all such components are required. On the contrary a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

FIG. 1E shows a system architecture for selecting security mode for applying selective security, according to an embodiment of the disclosure.

The system architecture 100 includes a UE 101, one or more Distributed Units (DUs) 103A-1 to 103C-N (herein after referred to as one or more distributed units or one or more DUs 103), one or more Centralized Units (CUs) 105A-1 to 105B-N (hereinafter referred to as one or more centralized units or one or more CUs 105), one or more User Plane Functions (UPF) 107-1 to 107-N (hereinafter referred to as UPF 107 or a core network entity 107) and an application layer 111 connected through the internet 109. As an example, the UE 101 may include, but not limited to, a mobile phone, laptop, computers and the like. In the system architecture 100, the one or more DUs 103 and one or more CUs 105 in combination constitutes a Radio Access Network (RAN) or a Base station (gNB). In other words, each RAN comprises one or more DUs 103 and a CU 105 as shown in FIG. 1F.

FIG. 1F shows an RAN and its elements, according to an embodiment of the disclosure.

As an example, the CU 105A-1 and DUs 103A-1 and 103A-2 may be combined to form a RAN entity 106. Similarly, as an example, the CU 105A-2 and DU 103B-2 may be combined to form another RAN entity. In the disclosure, the terms "RAN entity" and "RAN" are used interchangeably. Further, the UPF 107 may also be referred as a core network entity 107 in the context of the disclosure. As an example, as shown in the FIG. 1E, the core network entity 107A-1 may be associated with the RAN (105A-1, 103A-1 and 103A-2) and also the RAN (105A-2 and 103B-1). Initially, during a Protocol Data Unit (PDU) session establishment between the UE 101 and the core network entity 107, the core network entity 107 may receive from the UE 101, a first information block through the RAN 106. In some embodiments, the core network entity 107 may receive the first information block through a Radio Resource Configuration (RRC) Information Element (IE) message transmitted by the UE 101 during the session establishment. The RAN 106 may be associated with the core network entity 107 and the UE 101. In some embodiments, the first information block received by the core network entity may include, but not limited to, a capability of the UE 101 to support selective security and a preferred selective security mode from among the one or more selective security modes. The capability to support selective security may indicate whether the UE supports the selective security. The preferred selective security mode may be a selective security mode which is preferred/supported by the UE 101 among the one or more selective security modes. In some embodiments, the one or more selective security modes may include, but not limited to, packet classification at a UPF mode, packet classification at the RAN mode and a dedicated bearer mode.

In some embodiments, during a PDU session establishment between the UE 101 and the core network entity 107, the core network entity 107 may receive a second information block from the RAN 106. The second information block may include an indication whether the RAN 106 is capable of supporting the one or more selective security modes. Upon receiving the second information block, the core network entity 107 may determine whether the core network entity 107 and the RAN 106 are capable of supporting the preferred selective security mode which is indicated by the UE 101. Based on the determination, the core network entity 107 may apply the preferred selective security mode to one or more incoming data packets when at least one of the RAN 106 and core network entity 107 are determined to support the preferred selective security mode.

The core network entity 107 may apply the selective security based on the determined preferred selective security mode. In some embodiments, when the selective security mode is packet classification at the UPF mode, classification of the one or more incoming data packets into encrypted or un-encrypted packets is performed by the UPF (also known as core network entity 107), while the selective security is applied by the RAN 106 based on information transmitted by the UPF to the RAN 106 post classification. In some embodiments, when the selective security mode is packet classification at the RAN mode, the UPF would route the one or more incoming data packets to the RAN 106 while the RAN 106 performs both classification of the one or more incoming data packets and application of the selective security to the encrypted packets post classification. In yet other embodiments, when the selective security mode is a dedicated bearer mode, the UPF would determine specific header information or port number that indicates that the one or more incoming data packets correspond to the dedicated bearer and shall transmit such incoming data packets to the RAN 106. Thereafter, the RAN 106 would apply the selective security to the each of the one or more incoming data packets thus received and transmit through the dedicated bearer.

In some embodiments, if at least one of the core network entity 107 or the RAN 106 do not support the selective security mode as preferred by the UE 101, the RAN 106 may apply the selective security through one of the one or more selective security modes supported by at least one of the core network entity or the RAN based on the UE's capability to support selective security.

Further, in some embodiments, when the UE 101 is undergoing a handover process, the core network entity 107 may perform flow management for the selective security. In some embodiments, flow management may include classification information which is exchanged between the currently serving network entity and a target network entity in order to ensure that the handover is seamless and at the same time, ensure that selective security procedure post the handover is also seamless without any loss of data packets. Therefore, to perform the flow management for selective security, the core network entity 107 may initially determine during a handover, status of the handover to be one of an inter-RAN handover or an inter-UPF handover.

In some embodiments, when status of the handover is an inter-RAN handover, the handover would be between one RAN to another RAN, while the UPF or the core network entity 107 of both the RANs remains the same. As an example, in FIG. 1E, an inter-RAN handover may be a handover from DU 103A-2 to DU 103B-1, which in turn means that, the CU would change from CU 105A-1 to CU 105A-2. Therefore, in this inter-RAN handover, only the RAN elements i.e., CU and DU change, but the UPF 107-1 for both the RAN elements remains the same. In some other embodiments, when status of the handover is an inter-UPF handover, the handover would be between one UPF to another UPF, which means the handover results in change of not just the RAN elements but also the core network entity 107. As an example, in FIG. 1E, an inter-UPF handover may be a handover from DU 103A-2 to DU 103B-1, which in turn means that, the CU would change from CU 105A-1 to CU 105A-2. Therefore, in this inter-RAN handover, only the RAN elements i.e., CU and DU change, but the UPF 107-1 for both the RAN elements remains the same. In some embodiments, when the status of the handover is determined to the inter-RAN handover, the core network entity may transmit an information for performing the handover and an additional flow-based classification information from a RAN of a serving Distributing Unit (DU) to a RAN of a target DU. In some embodiments, the additional flow-based classification information may include, but not limited to, at least one of a header information corresponding to each of the one or more incoming data packets and data related to a selective security mode supported by the at least one of a RAN and UPF. In some embodiments, the header information may include, but not limited to, a source IP address, a destination IP address, a source port, a destination port and a protocol. Thereafter, the core network entity 107 may perform the handover from the RAN of the serving DU to the RAN of the target DU based on the information transmitted for performing the handover. Post the handover, the core network entity 107 may facilitate application of a selective security to one or more incoming data packets based on the additional flow-based classification information at a core network entity associated with the RAN of the target DU.

However, when the status of the handover is determined to be the inter-UPF handover, the core network entity 107 may transmit the information for performing the handover and the additional flow-based classification information from a UPF associated with the RAN of the serving DU to a UPF associated with the RAN of the target DU. Thereafter, the core network entity 107 may perform the handover from the UPF associated with the RAN of the serving DU to the UPF associated with the RAN of the target DU. Post the handover, the core network entity 107 may facilitate application of a selective security to one or more incoming data packets based on the additional flow-based classification information at a core network entity associated with the RAN of the target DU. In this manner, the disclosure is able to transmit the additional flow-based classification information during the handover and ensure that the selective security mode as applicable at the source end is carried forward and applicable post-handover as well at the target end, in a lossless manner.

FIG. 2A shows a detailed block diagram of a core network entity for selecting security mode for applying selective security, according to an embodiment of the disclosure.

In some implementations, the core network entity 107 may include data 213 and modules 211. As an example, the data 213 is stored in the memory 209 configured in the core network entity 107 as shown in the FIG. 2A. In one embodiment, the data 213 may include an information block data 215, a selective security mode data, incoming packet data 219 and other data 221. In the illustrated FIG. 2A, modules 211 are described herein in detail.

In some embodiments, the data 213 may be stored in the memory 209 in form of various data structures. Additionally, the data 213 can be organized using data models, such as relational or hierarchical data models. The other data 221 may store data, including temporary data and temporary files, generated by the modules 211 for performing the various functions of the core network entity 107.

In an embodiment, the information block data 215 may include the data transmitted from a UE 101 and a Radio Access Network (RAN) 106 via information blocks. The information block data 215 may include the capability information of the UE 101 and the RAN 106. For example, consider the UE 101 transmits a first information block to the core network entity 107 and the RAN 106 transmits a second information block to the core network entity 107. In some embodiments, the UE 101 may transmit the first information block to the core network entity 107 through the RAN 106. The first information block may include the capability information of the UE 101, which comprises the capability of the UE 101 to support the selective security and the preferred selective security mode among the one or more selective security modes. In some embodiments, the first information block may further include, but not limited to, an indication of presence of Hardware Accelerator (HWA) for the selective security. In some embodiments, hardware accelerators are the specific hardware into which certain security procedures of the UE 101 are offloaded. This allows to save CPU resources on the UE 101 by adding a new dedicated HW for ciphering and security operations. It is useful to know if there is presence of HWA or not for selective security as low power low-cost devices may not contain such additional hardware accelerators.

Similarly, the second information block may include the capability information of the RAN 106, which comprises the capability of the RAN 106 to support selective security and the selective security modes that the RAN 106 can support. The UE 101 may either support the selective security or may not support the selective security. If the UE 101 supports the selective security, then the UE 101 may indicate its preferred selective security mode among the one or more selective security modes. In some embodiments, the preferred selective security mode may be one of the selective security modes that is supported by the UE 101, and apt as per the requirement of the UE 101. The core network entity 107 may receive the information block data 215 during the session establishment between the UE 101 and the core network entity 107.

In an embodiment, the selective security mode data 217 may include information related to applying the one or more selective security modes to the one or more incoming data packets. The one or more selective security modes may include at least one of packet classification at the UPF mode, packet classification at the RAN mode and a dedicated bearer mode. In some embodiments, the selective security mode data 217 may further store the preferred selective security mode of the UE 101 as well.

In an embodiment, the incoming packet data 219 may include the data associated with the one or more incoming data packets. The incoming packet data 219 may comprise header information or in other words, a 5-tuple data, which includes without limitation, a source IP address, destination IP address, source port number, destination port number and a protocol. The source IP address may indicate the IP address of the source device or a host that has sent the incoming data packet. Similarly, the destination IP address may indicate the IP address of a destination device or a host to which the incoming data packets needs to be transmitted. The source port number may represent a port through which the incoming data packets were sent, and the destination port number may represent the port number through which that incoming data packets should be received at the destination address. Further, the protocol may indicate a set of rules about the exchange of information in a communication network. For example, the protocol may include, but not limited to, a Transport Control Protocol/Internet Protocol (TCP/IP), User Datagram Protocol/Internet protocol (UDP/IP), Hyper Text Transfer Protocol (HTTP), and File Transfer Protocol (FTP). For example, if the packet includes a TCP protocol, then the core network entity 107 may determine if the TLS header is present to determine the encryption status of the incoming data packets. Hence, the core network entity 107 may use the incoming packet data 219 to determine the encryption status of the one or more incoming data packets.

In some embodiments, the data 213 stored in the memory 209 may be processed by the modules 211 of the core network entity 107. The modules 211 may be stored within the memory 209. In an example, the modules 211 communicatively coupled to the processor 205 configured in the core network entity 107, may also be present outside the memory 209 as shown in FIG. 2A and implemented as hardware. The core network entity 107 may communicate with one or more entities via I/O interface 207. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 211 may include, for example, a receiving module 223, a determining module 225, a selective security applying module 227, and other modules 229. The other modules 229 may be used to perform various miscellaneous functionalities of the core network entity 107. It will be appreciated that such aforementioned modules 211 may be represented as a single module or a combination of different modules.

In some embodiments, the receiving module 223 may receive the first information block from the UE 101 which indicates the capability of the UE 101 to support the selective security and a preferred selective security mode of the UE 101. Also, the receiving module 223 may receive the second information block from the RAN 106 which indicates the capability of the RAN 106 to support the selective security and the preferred selective security mode of the RAN 106. The receiving module 223 may receive the first information block and second information block during a PDU session establishment between the core network entity 107 and the UE 101. During the PDU session establishment, the first information block and second information block may be included in the RRC message during the connection establishment Moreover, the receiving module 223 may receive the one or more incoming data packets from the application layer 111 through the internet 109. In some embodiments, the receiving module 223 may also receive a port number specified for the transmission of one or more incoming data packets to the core network entity 107.

In some embodiments, the determining module 225 may determine whether the core network entity 107 and the RAN 106 are capable of supporting the preferred selective security as indicated by the UE 101. The determining module 225 may initially determine whether the UE 101 supports the selective security based on the first information block received from the UE 101. Further, the determining module 225 may determine capability of at least one of the core network entity 107 and the RAN 106 to support the preferred selective security mode indicated by the UE 101. In some embodiments, the determining module 225 may determine whether the RAN 106 is capable of supporting the preferred selective security mode of the UE 101, based on the second information block received from the RAN 106.

In some embodiments, the selective security applying module 227 may apply selective security to the one or more incoming data packets. In some embodiments, when the determining module 225 determines that at least one of the core network entity or the RAN are capable of supporting the preferred selective security mode, the selective security applying module 227 may apply the selective security to the one or more incoming data packets through the preferred selective security mode based on an encryption status of the one or more incoming data packets. In some embodiments, the encryption status of the one or more incoming data packets may be indication of whether an incoming data packet is encrypted or un-encrypted. In some embodiments, when the determining module 225 determines that the selective security mode preferred by the UE is not supported by at least one of the core network entity 107 and the RAN 106, the selective security applying module 227 may apply the selective security through one of the one or more selective security modes supported by at least one of the core network entity 107 or the RAN 106 based on the UE's capability to support selective security.

In some embodiments, the selective security may be applied through the one or more selective security modes. The one or more selective security modes may include, but not limited to, packet classification at the UPF mode, packet classification at the RAN mode and a dedicated bearer mode.

Packet Classification at the UPF Mode

In some embodiments, when the preferred selective security mode is packet classification at the UPF mode, classification of the one or more incoming data packets into encrypted or un-encrypted packets is performed by the UPF, while the selective security is applied by the RAN 106 based on information transmitted by the UPF to the RAN 106 post classification. In the packet classification at the UPF mode, initially, the selective security applying module 227 of the core network entity 107 may determine an encryption status of the one or more incoming data packets of a data stream based on the header information (5-tuple data) corresponding to the one or more incoming data packets. The encryption status may indicate whether the one or more incoming data packets are encrypted or not encrypted. Further, the selective security applying module 227 may determine the length of the un-ciphered headers in the one or more incoming data packets. The encryption status and the length of the un-ciphered header may be together referred as ciphering information. However, if the length of the un-ciphered header is not informed to the RAN 106, then the RAN 106 may use a default configuration for determining un-ciphered header length of the one or more incoming data packets during the radio bearer set-up with the UE 101. In some embodiments, the ciphering information may be compressed for further transmission. Thereafter, the selective security applying module 227 may transmit a data packet header to the RAN 106 comprising the ciphering information. During the transmission, the selective security applying module 227 may indicate for the subsequent one or more incoming data packets of the data flow whether there is change in the ciphering information with respect to the first incoming data packet of the data flow. The change in the ciphering information may be indicated by transmitting a single bit message. The single bit message represents whether the subsequent one or more incoming data packets have the same ciphering information as that of the first incoming data packet. For example, no change in ciphering information may indicate that the subsequent one or more incoming data packets of the data flow have the same encryption status and the un-ciphered header length as that of the first incoming data packet of the data flow. The selective security applying module 227 may indicate that there is no change in ciphering information for the one or more subsequent incoming data packets with respect to the first incoming data packet, using a single bit of GPRS Tunneling Protocol Tunnel Endpoint Identifier (GTP TEID) information transmitted between the core network entity 107 and RAN 106. As an example, if the single bit message indicates a flag "1", it may indicate that the encryption status and ciphering information of the one or more subsequent incoming data packets of the data flow is same as that of the first incoming data packet. However, if the single bit message indicates a flag "0", it may indicate that the encryption status and ciphering information of the one or more subsequent incoming data packets of the data flow is different from that of the first incoming data packet. In other words, the single bit message with flag "0" may indicate end of the incoming data packets of that data flow, and may indicate that a new data flow has arrived. In some other embodiments, if the encryption status of the one or more incoming data packets is determined to be unencrypted, then the selective security applying module 227 may indicate the same using a single bit message to the RAN 106 for applying full security for the one or more incoming data packets. In another embodiment, when the selective security applying module 227 may not be able to determine the length of the un-ciphered header, then the RAN 106 may use a default configuration to apply selective security for the one or more incoming data packets. Hence, the classification at core network entity/UPF mode may indicate the RAN 106 about the ciphering information of the one or more incoming data packets which reduces the overhead at the RAN for applying the selective security. Also, the transmission of the data packet header by the core network entity 107 may enhance the data transmission due to less exchange of information, and may optimize the information exchange between UPF and RAN with the available bandwidth and resources.

Packet Classification at the RAN Mode

In some embodiments, when the preferred selective security mode is packet classification at the RAN mode, the selective security applying module 227 of the core network entity 107 may transmit the one or more incoming data packets to the RAN 106 while the RAN 106 performs both classification of the one or more incoming data packets and application of the selective security to the encrypted packets post classification. In some embodiments, when the preferred selective security mode is packet classification at the RAN mode, upon transmitting the one or more incoming data packets to the RAN 106, the RAN 106 may determine the encryption status of the one or more incoming data packets of the data flow based on the header information of the corresponding one or more incoming data packets. In some embodiments, the header information may include the 5-tuple data for the one or more incoming data packets. Also, the 5-tuple data for the one or more incoming data packets may be stored in a hash table at the RAN 106. When there is any termination of the data flow, the entry in the hash table may be removed. The selective security applying module 227 may analyze the 5-tuple data in each of the one or more incoming data packets to determine the encryption status of the one or more incoming data packets. Further, the RAN 106 may determine the encryption status based on the TLS header of the one or more incoming data packets, which may be stored in the hash table. As an example, the TLS header may be present when the one or more incoming data packets are Transport Control Protocol (TCP) packets. The presence of the TLS header may indicate that the one or more incoming data packets are "encrypted". Similarly, if the TLS header is not present in the one or more incoming data packets, then the one or more incoming data packets may be considered to be "unencrypted". Furthermore, upon analyzing the encryption status, the selective security applying module 227 may apply the selective security to the one or more incoming data packets through the RAN 106.

Dedicated Bearer Mode

In some embodiments, when the preferred selective security mode is a dedicated bearer mode, then the core network entity 107 may assign a dedicated bearer and a dedicated Quality of Service (QoS) to the dedicated bearer for applying the selective security to the one or more incoming data packets that are encrypted. In some embodiments, the dedicated bearer may be a network element configured in the RAN 106 which is specifically configured with a QoS and dedicated for communicating the encrypted data packets. In some embodiments, the selective security applying module 227 may determine the encryption status of the one or more incoming data packets of a data stream based on the header information of the corresponding one or more incoming data packets. As an example, the encryption status may be determined to be one of encrypted or unencrypted. Further, the Non-Access Stratum (NAS) message may control a Traffic Flow Template (TFT) so that all the one or more encrypted packets are mapped towards the dedicated bearer. In some embodiments, the determination of the encryption status can be performed based on the TLS header of the one or more incoming data packets of a data flow. As an example, if the TLS header is present in one or more incoming data packets, then the encryption status may be determined to be "encrypted". However, if the TLS header is not present in the one or more incoming data packets, then the encryption status may be determined to be "not encrypted" or "unencrypted". Upon determination of the encryption status, the core network entity 107 may transmit the one or more incoming data packets to the RAN 106, and apply the selective security to the one or more incoming data packets through the RAN 106, based on the dedicated QoS assigned to the dedicated bearer. In some embodiments, upon applying the selective security, the one or more incoming data packets may be transmitted to the UE 101 through the dedicated bearer. In some embodiments, the transmission of one or more incoming data packets towards the dedicated bearer may be controlled using the TFT. The TFT may help in checking the presence of TLS header in the one or more incoming data packets. In some embodiments, the application layer 111 may invoke a message to inform about a specific port number for all the TLS packets, so that all the TLS packets may be communicated between the application layer 111 and the core network entity/UPF 107 through the specified port number. Also, all the incoming data packets upon application of the selective security are transmitted on the specified port number and may be tagged with the dedicated QoS value. In some embodiments, the mention of specified port number in the one or more incoming data packets may also indicate that the encryption status of the incoming data packet is "encrypted", as the specific port number is mapped to the dedicated bearer which is exclusively for encrypted data packets which need to be served with a dedicated QoS.

FIG. 2B shows a detailed block diagram of a Radio Access network (RAN) for selecting security mode for applying selective security, according to an embodiment of the disclosure.

In some implementations, the RAN 106 may include data 231 and modules 233. As an example, the data 231 is stored in the memory 235 configured in the RAN 106 as shown in the FIG. 2B. In one embodiment, the data 231 may include an information block data 237, a selective security mode data 239, secured packet data 241 and other data 243. In the illustrated FIG. 2B, modules 233 are described herein in detail.

In some embodiments, the data 231 may be stored in the memory 235 in form of various data structures. Additionally, the data 231 can be organized using data models, such as relational or hierarchical data models. The other data 231 may store data, including temporary data and temporary files, generated by the modules 233 for performing the various functions of the RAN 106.

In an embodiment, the information block data 237 of RAN 106 may include the data transmitted from a UE 101 via information blocks. In some embodiments, the UE 101 may transmit the first information block to the core network entity 107 through the RAN 106. The first information block received by the RAN 106 may include the capability information of the UE 101, which comprises the capability of the UE 101 to support selective security and a preferred selective security mode among the one or more selective security modes. The UE 101 may either support the selective security or may not support the selective security. If the UE 101 supports the selective security, then the UE 101 may indicate its preferred selective security mode among the one or more selective security modes. In some embodiments, the preferred selective security mode may be one of the selective security modes that is supported by the UE 101, and apt as per the requirement of the UE 101. In some embodiments, the first information block may further include, but not limited to, an indication of presence of Hardware Accelerator (HWA) for the selective security. In some embodiments, the information block data 237 may further include a second information block which the RAN 106 may share with the core network entity 107. The second information block may include the capability information of the RAN 106, which comprises the capability of the RAN 106 to support selective security and the selective security modes that the RAN 106 can support. As an example, if the RAN 106 supports packet classification at the RAN mode, the RAN 106 may perform both, classifying one or more incoming data packets received at the RAN 106 and applying selective security to the one or more incoming data packets classified as "encrypted". Similarly, if the RAN 106 supports packet classification at the UPF mode, the RAN 106 may receive encryption status of the one or more incoming data packets that are classified at the UPF along with ciphering information and a single bit message, that enables the RAN 106 to apply selective security to the one or more incoming data packets classified as "encrypted", based on the received ciphering information and the single bit message from the UPF. Similarly, if the RAN 106 supports a dedicated bearer mode, the RAN 106 may receive the one or more incoming data packets mapped to a dedicated bearer and apply selective security to each of the one or more incoming data packets mapped to the dedicated bearer. The RAN 106 may transmit the information block data 237 during a PDU session establishment between the UE 101 and the core network entity 107. In some embodiments, the RAN 106 may transmit the second information block during the PDU session establishment or any time prior to the session establishment such that the core network entity is aware of the capabilities of the RAN 106.

In an embodiment, the selective security mode data 239 may include information related to applying the one or more selective security modes to the one or more incoming data packets. In the disclosure, the selective security mode data 239 may include, but not limited to, preferred selective security mode of the UE 101, a data packet header comprising a ciphering information and a length of un-ciphered headers, and a single bit message information received from the core network entity 107 post classification. The RAN 106 may apply selective security to the one or more incoming data packets based on selective security mode data 239.

In some embodiments, the secured packet data 241 may include the one or more incoming data packets to which the RAN 106 has applied selective security.

In some embodiments, the data 231 stored in the memory 235 may be processed by the modules 233 of the RAN 106. The modules 233 may be stored within the memory 235. In an example, the modules 233 communicatively coupled to the processor 234 configured in the RAN 106, may also be present outside the memory 235 as shown in FIG. 2B and implemented as hardware. The RAN 106 may communicate with one or more entities via I/O interface 236. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 233 may include, for example, a receiving module 245, a selective security applying module 247, and other modules 249. The other modules 249 may be used to perform various miscellaneous functionalities of the RAN 106. It will be appreciated that such aforementioned modules 233 may be represented as a single module or a combination of different modules.

In some embodiments, the transceiver module 245 may transmit a first information block received from the UE 101, to a core network entity 107 associated with the RAN 106, wherein the first information block comprises at least one of an indication of UE's capability to support selective security, and a preferred selective security mode from one or more selective security modes. Further, the transceiver module 245 may receive when the preferred selective security mode is packet classification at the UPF mode, a data packet header corresponding to a first incoming data packet of the one or more incoming data packets of the data flow. In some embodiments, the data packet header may include, but not limited to, a ciphering information indicating an encryption status of the first incoming data packet and a length of un-ciphered headers in the first incoming data packet. Further, the receiving module 245 may receive a single bit message along with the data packet header, for each data flow. The single bit message may indicate that the ciphering information of each of rest of the one or more incoming data packets of the data flow other than the first incoming data packet is same as the ciphering information of the first incoming data packet. In other words, the change in the ciphering information may be indicated by transmitting a single bit message. For example, no change in ciphering information may indicate that the subsequent one or more incoming data packets of the data flow have the same encryption status and the un-ciphered header length as that of the first incoming data packet of the data flow. As an example, if the single bit message indicates a flag "1", it may indicate that the encryption status and ciphering information of the one or more subsequent incoming data packets of the data flow is same as that of the first incoming data packet. However, if the single bit message indicates a flag "0", it may indicate that the encryption status and ciphering information of the one or more subsequent incoming data packets of the data flow is different from that of the first incoming data packet. In other words, the single bit message with flag "0" may indicate end of the incoming data packets of that data flow, and may indicate that a new data flow has arrived.

In some embodiments, the selective security applying module 247 may thereafter apply the selective security to each of the one or more incoming data packets of the data flow based on the ciphering information. For instance, based on length of the un-ciphered headers of an encrypted data packet, provided as part of the ciphering information, the selective security applying module 247 may apply the selective security to the un-ciphered header part of the encrypted data packet. In some embodiment, if the length of the un-ciphered header is not determined, then the RAN 106 may use a default configuration to apply selective security for the one or more incoming data packets. Hence, when the preferred selective security mode is the classification at core network entity/UPF mode, the RAN 106 receives ciphering information of the one or more incoming data packets which reduces the overhead at the RAN 106 for applying the selective security. Also, receiving the data packet header from the core network entity 107 may enhance the data transmission due to less exchange of information, and may optimize the information exchange between UPF and RAN with the available bandwidth and resources.

FIG. 2C shows a detailed block diagram of a core network entity for flow management for selective security during the handover, according to an embodiment of the disclosure.

In some embodiments the core network entity 107 may perform the method of flow management for selective security in continuation to the method of selecting the selective security mode for applying selective security. For instance, when the UE 101 moves from one location to another location, there is a need for handing over the UE 101 to a different core network entity or a different RAN. During this process, there is a need to communicate the information related to selective security as well such that, the UE 101 can get the selective security service as per the preferred selective security mode by the UE, even after a handover to a different core network entity or a RAN. This eliminates the process where the UE 101 may have to provide capability information, preferred selective security mode and the like, to avail the selective security service, each time the UE 101 undergoes a handover. Therefore, as per some embodiments of the disclosure, the detailed module figure of the core network entity 107 may have the data and the modules required for performing the method of selecting the selective security mode for applying selective security as discussed in detail under FIG. 2A. Along with the data and modules discussed under FIG. 2A, the core network entity 107 may include additional data 251 and modules 253 that explicitly are configured to perform flow management for selective security during handover. Therefore, the description of FIG. 2A is referred in totality here.

Further, in some implementations, the core network entity 107 may include data 251 and modules 253 as discussed above. As an example, the data 251 is stored in the memory 209 configured in the core network entity 107 as shown in the FIG. 2C. In one embodiment, the data 251 may include along with the data 213 of the core network entity 107 as discussed in FIG. 2A in the earlier sections of the disclosure, status data 255, handover data 257, and classification data 259. In the illustrated FIG. 2C, modules 253 are described herein in detail.

In some embodiments, the data 251 may be stored in the memory 209 in form of various data structures. Additionally, the data 251 can be organized using data models, such as relational or hierarchical data models.

In some embodiments, the data 251 stored in the memory 209 may be processed by the modules 253 of the core network entity 107. The modules 253 may be stored within the memory 209. In an example, the modules 253 communicatively coupled to the processor 205 configured in the core network entity 107, may also be present outside the memory 209 as shown in FIG. 2C and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 253 may include, along with the modules 211 of the core network entity 107 as discussed in FIG. 2A in the earlier sections of the disclosure, a status determining module 261, an information transmitting module 263, a handover module 265, and a selective security facilitating module 267. It will be appreciated that such aforementioned modules 253 may be represented as a single module or a combination of different modules.

In some embodiments, the status determining module 261 may further determine status of the handover, during the handover. As an example, the status of the handover may be one of an inter-RAN handover or an inter-UPF handover. The status of the handover thus determined may be stored as the status data 255. In some embodiments, when the status determining module 261 determines status of the handover to be an inter-RAN handover, the handover would be between one RAN to another RAN, while the UPF or the core network entity 107 of both the RANs remains the same. As an example, in FIG. 1E, an inter-RAN handover may be a handover from DU 103A-2 to DU 103B-1, which in turn means that, the CU would change from CU 105A-1 to CU 105A-2. Therefore, in this inter-RAN handover, only the RAN elements i.e., CU and DU change, but the UPF 107-1 for both the RAN elements remains the same. In some other embodiments, when the status determining module 261 determines status of the handover to be an inter-UPF handover, the handover would be between one UPF to another UPF, which means the handover results in change of not just the RAN elements but also the UPF or core network entity 107. As an example, in FIG. 1E, an inter-UPF handover may be a handover from DU 103A-2 to DU 103B-1, which in turn means that, the CU would change from CU 105A-1 to CU 105A-2, and the UPF would change from UPF 107-1 to 107-N.

In some embodiments, the information transmitting module 263 may transmit an information for performing the handover and an additional flow-based classification information from a RAN of a serving Distributing Unit (DU) to a RAN of a target DU, when the status of the handover is determined to be the inter-RAN handover. In some embodiments, as per the example given in the above paragraph, consider the handover is an inter-RAN handover from DU 103A-2 to DU 103B-1, which in turn means that, the CU would change from CU 105A-1 to CU 105A-2. Therefore, as per this example, DU 103A-2 may be referred as the serving DU, and DU 103B-1 may be referred as the target DU. RAN is a network entity such as a base station (eNB, gNB etc.) that comprises one or more DUs and CUs as RAN elements. Therefore, RAN of the serving DU may refer to RAN that comprises the serving DU as a RAN element. Similarly, RAN of the target DU may refer to RAN that comprises the target DU as a RAN element.

Similarly, when the status of the handover is determined to be the inter-UPF handover, the information transmitting module 263 may transmit the information for performing the handover and the additional flow-based classification information from a UPF associated with the RAN of the serving DU to a UPF associated with the RAN of the target DU. In some embodiments, as per the example given in the above paragraphs, consider the handover is an inter-UPF handover from UPF 107-1 to 107-N, then UPF 107-1 may be referred as UPF associated with the RAN of the serving DU since the serving DU is DU 103A-2, and the UPF 107-N may be referred as UPF associated with the RAN of the target DU since the target DU is DU 103B-1.

In some embodiments, the information for performing the handover may include, for instance, ID of the target DU, reconfiguration information due to the handover, and the like, which enables the handover from RAN of the serving DU to RAN of the target DU. The information transmitted for the handover may be stored as the handover data 257. The additional flow-based classification information may include, but not limited to, a header information corresponding to each of the one or more incoming data packets and data related to a selective security mode supported by the at least one of a RAN 106 and UPF 107. In some embodiments, the header information may include, but not limited to, a source IP address, a destination IP address, a source port, a destination port and a protocol. The additional flow-based classification information may be stored as the classification data 259.

In some embodiments, when the status of the handover is determined to be the inter-RAN handover, the handover module 265 may perform handover from the RAN of the serving DU to the RAN of the target DU based on the information transmitted for performing the handover. Similarly, when the status of the handover is determined to be the inter-UPF handover, the handover module 265 may perform handover from the UPF associated with the RAN of the serving DU to the UPF associated with the RAN of the target DU based on the information transmitted for performing the handover. The inter-RAN handover or the inter-UPF handover may be performed via predefined techniques for handover.

In some embodiments, when the status of the handover is determined to be the inter-RAN handover, the selective security facilitating module 267 may facilitate application of the selective security to one or more incoming data packets based on the additional flow-based classification information at a core network entity (or the UPF) associated with the RAN of the target DU, post-handover. When the additional info is transmitted in the aforementioned manner to the apt network entity during the handover, based on the status of the handover, the additional flow-based classification information helps in ensuring that the selective security mode as applicable at the source end is carried forward and applicable post-handover as well at the target end, in a lossless manner. This ensures continuity of selective security for the UE even after a handover, thus enhancing the user experience.

In some embodiments, during an inter-RAN handover or an inter-UPF handover, when the additional flow-based classification information indicates a preferred selective security mode as a dedicated bearer mode, the core network entity associated with the RAN of the target DU may determine a dedicated bearer supported by the serving DU based on data related to the preferred selective security mode included in the additional flow-based classification information. When the target DU is capable of supporting the dedicated bearer mode, the core network entity associated with the RAN of the target DU may perform routing of the one or more incoming data packets through one of a same dedicated bearer supported by the serving DU or a newly configured dedicated bearer supported by the target DU. In some embodiments, consider the dedicated bearer supported by the serving DU is for example, dedicated bearer 10. Post-handover, if the target DU supports the dedicated bearer mode, and the dedicated bearer assigned at the target DU is also a dedicated bearer 10, then the dedicated bearer of the target DU is considered to be same as the dedicated bearer of the serving DU. In such a scenario, without any change in the dedicated bearer configuration, the one or more incoming data packets would be routed through the dedicated bearer 10. On the contrary, if the target DU supports the dedicated bearer mode, and the dedicated bearer assigned at the target DU is a new dedicated bearer, for instance dedicated bearer 5, then the dedicated bearer of the target DU is considered to be different from the dedicated bearer of the serving DU. In such a scenario, new dedicated bearer at the target DU is configured for supporting the dedicated bearer mode, and the one or more incoming data packets would be routed through the new dedicated bearer 5. However, if the target DU is not capable of supporting the dedicated bearer mode at all, then the core network entity associated with the RAN of the target DU routes the one or more incoming data packets through a normal bearer supported by the target DU that carries both encrypted and un-encrypted data packets.

FIGS. 3A, 3B, 3C, 3D, 3E, 3F, and 3G are flowcharts illustrating methods for selecting security mode for applying selective security and for flow management for selective security during handover, according to various embodiments of the disclosure.

Referring to FIGS. 3A to 3G, the methods include one or more blocks illustrating the. The methods may be described in the general context of computer executable instructions. Generally, computer executable instructions can include routines, programs, objects, components, data structures, procedures, modules, and functions, which perform functions or implement abstract data types.

The order in which the methods are described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

FIG. 3A shows a flowchart illustrating a method for selecting security mode for applying selective security, from a core network entity perspective, according to an embodiment of the disclosure.

At operation 301, the method 300A may include receiving, by a core network entity 107, a first information block from the UE 101. The first information block may be received by the core network entity 107 through the RAN 106 which is associated with the UE 101 and the core network entity 107. The first information block may include at least one of UEs capability to support selective security and preferred selective security mode from one or more selective security modes. In some embodiments, the one or more selective security modes may include, but not limited to, a classification at RAN mode, packet classification at the UPF mode, and a dedicated bearer mode. The first information block may further include an indication of presence of Hardware Accelerator (HWA) for the selective security. The first information block may be transmitted by the UE 101 along the with RRC message during a PDU session establishment between the core network entity 107 and the UE 101.

At operation 303, the method 300A may include, determining, by the core network entity 107, if at least one of the core network entity 107 and RAN 106 are capable of supporting the preferred selective security mode which is indicated by the UE 101.

At operation 305, the method 300A may include, applying, by the core network entity 107, selective security to one or more incoming data packets through the preferred selective security mode based on an encryption status of the one or more incoming data packets. In some embodiments, the preferred selective security mode is applied when at least one of the core network entity 107 and the RAN 106 are determined to be capable of supporting the preferred selective security mode as indicated by the UE 101. However, in some embodiments, when the selective security mode preferred by the UE is not supported by at least one of the core network entity 107 and the RAN 106, the core network entity 107 may apply the selective security through one of the one or more selective security modes supported by at least one of the core network entity or the RAN based on the UE's capability to support selective security. For instance, preferred selective security mode of the UE was a dedicated bearer mode. Consider the core network entity 107 and the RAN 106 do not possess the capability to support the preferred selective security mode i.e., the dedicated bearer mode. Then the core network entity 107 may check the capability information of the UE 101 received via the first information block. Based on the capability information of the UE 101, if the core network entity 107 determines that the UE 101 is capable of supporting the packet classification at UPF mode, then the core network entity 107 would apply the selective security via the packet classification at the UPF mode.

FIG. 3B shows a flowchart illustrating a method for applying selective security when the preferred selective security mode is classification at UPF, according to an embodiment of the disclosure.

At operation 311, the method 300B may include, determining, by the core network entity 107, an encryption status of the one or more incoming data packets of a data stream based on header information of the corresponding one or more incoming data packets. The encryption status may be determined based on the presence of the TLS header in the one or more incoming data packets. In some embodiments, the encryption status may be an indication of whether the one or more incoming data packets are encrypted or un-encrypted.

At operation 313, the method 300B may include, transmitting, by the core network entity 107, a data packet header corresponding to a first incoming data packet of the one or more incoming data packets to the RAN 106. The core network entity 107 may transmit the data packet header to the RAN 106 in a compressed format, where the data packet header may include ciphering information. In some embodiments, the ciphering information may indicate the encryption status of the first incoming data packet and length of the un-ciphered header in the first incoming data packet. Further, the core network entity 107 may transmit a single bit message corresponding to each of rest of the one or more incoming data packets of the data flow. In some embodiments, the single bit message transmitted to the RAN 106 may indicate whether the ciphering information of each of the rest of the one or more incoming data packets of the data flow is same or different from the ciphering information of the first incoming data packet. As an example, if the incoming data packets belong to the same data flow, then in majority of scenarios, the ciphering information of all the incoming data packets of the data flow would be same as the ciphering information of the first incoming data packet. However, in scenarios where it is different, or if the data flow has changed, then through the single bit message the core network entity indicates to the RAN 106 that it is different. The RAN 106 would then receive updated information from the core network entity 107 and proceed further.

At operation 315, the method 300B may include applying, by the core network entity 107, the selective security to the one or more incoming data packets, through the RAN 106, based on the ciphering information received from the core network entity 107.

FIG. 3C shows a flowchart illustrating a method for applying selective security when the preferred selective security mode is selected as classification at RAN, according to an embodiment of the disclosure.

At operation 321, the method 300C may include, transmitting, by the core network entity 107 RAN 106, one or more incoming data packets to the RAN 106. In some embodiments, the RAN 106 may determine encryption status of the one or more incoming data packets of a data flow based on header information of the corresponding one or more incoming data packets. The header information may include the source IP address, destination IP address, source port number, destination port number and a protocol information. For example, if the protocol information is TCP/IP the presence of the TLS header may indicate that the one or more incoming data packets may be encrypted.

At operation 323, the method 300C may include, applying, by the core network entity 107, the selective security to the one or more incoming data packets through the RAN 106, based on the encryption status of the one or more incoming data packets.

FIG. 3D shows a flowchart illustrating a method for applying selective security when the preferred selective security mode is a dedicated bearer, according to an embodiment of the disclosure.

At operation 331, the method 300D may include, assigning, by the core network entity 107, a dedicated bearer and a dedicated Quality of Service (QoS) to the dedicated bearer for applying the selective security to the one or more incoming data packets that are encrypted. In some embodiments, the dedicated QoS that is required for a particular UE or an application may depend on multiple parameters related to packet quality expectations that may include, but not limited to, packet delay, budget, throughput and the like. In some embodiments, the QoS numbers may be standardized. For instance, QoS=9 may set the QoS requirements related to packet delay and throughput. In some embodiments, the network elements such as the core network entity 107 and RAN 106 need to be aware of the QoS which ensures that the packet quality expectations for a particular UE or the application is met.

At operation 333, the method 300D may include, determining, by the core network entity 107, the encryption status of the one or more incoming data packets of the data flow based on header information of the corresponding one or more incoming data packets.

At operation 335, the method 300D may include, transmitting, by the core network entity 107, the one or more incoming data packets whose encryption status is determined to be "encrypted", to the RAN 106.

At operation 337, the method 300D may include, applying, by the core network entity 107, the selective security to the one or more incoming data packets through the RAN, based on the dedicated QoS assigned to the dedicated bearer. In some embodiments, the one or more incoming data packets are transmitted to the UE through the dedicated bearer upon applying the selective security.

FIG. 3E shows a flowchart illustrating a method for selecting security mode for applying selective security, from a RAN perspective, when the preferred selective security mode is a packet classification at UPF mode, according to an embodiment of the disclosure.

At operation 340, the method 300E may include transmitting, by the RAN 106, a first information block received from a User Equipment (UE), to a core network entity associated with the RAN. In some embodiments, the first information block comprises at least one of an indication of UE's capability to support selective security, and a preferred selective security mode from one or more selective security modes.

At operation 341, the method 300E may include receiving, by the RAN 106, when the preferred selective security mode is packet classification at the UPF mode, a data packet header corresponding to a first incoming data packet of the one or more incoming data packets of the data flow, from the core network entity 107. In some embodiments, the data packet header may include, but not limited to, ciphering information indicating an encryption status of the first incoming data packet and a length of un-ciphered headers in the first incoming data packet. Further, the method includes receiving, by the RAN 106, a single bit message indicating that the ciphering information of each of rest of the one or more incoming data packets of the data flow other than the first incoming data packet is same as the ciphering information of the first incoming data packet, for each data flow, from the core network entity.

At operation 343, the method 300E includes applying, by the RAN 106, the selective security to each of the one or more incoming data packets of the data flow based on the ciphering information.

FIG. 3F shows a flowchart illustrating a method of flow management for selective security mode for applying selective security, from an inter-RAN handover perspective, according to an embodiment of the disclosure.

At operation 345, the method 300F includes determining, by a core network entity 107 associated with RAN of a currently serving DU, during a handover, status of the handover to be one of an inter-RAN handover or an inter-UPF handover.

At operation 347, the method 300F includes transmitting, by the core network entity 107, an information for performing the handover and an additional flow-based classification information from a RAN of a serving Distributing Unit (DU) to a RAN of a target DU, when the status of the handover is determined to be the inter-RAN handover. In some embodiments, the additional flow-based classification information may include at least one of a header information corresponding to each of the one or more incoming data packets and data related to a selective security mode supported by the at least one of a RAN and UPF. The header information comprises at least one of a source IP address, a destination IP address, a source port, a destination port and a protocol.

At operation 349, the method 300F includes performing, by the core network entity 107, the handover from the RAN of the serving DU to the RAN of the target DU based on the information transmitted for performing the handover.

At operation 351, the method 300F includes facilitating, by the core network entity 107, application of a selective security to one or more incoming data packets based on the additional flow-based classification information at a core network entity associated with the RAN of the target DU, post-handover. In some embodiments, if the additional flow-based classification information indicates a selective security mode preferred by the UE 101 as a dedicated bearer mode, the core network entity associated with the RAN of the target DU may determine a dedicated bearer supported by the serving DU based on data related to the preferred selective security mode included in the additional flow-based classification information. If the target DU is capable of supporting the dedicated bearer mode, the core network entity associated with the RAN of the target DU performs one of routing the one or more incoming data packets through one of a same dedicated bearer supported by the serving DU or a newly configured dedicated bearer supported by the target DU. However, if the target DU is not capable of supporting the dedicated bearer mode, the core network entity associated with the RAN of the target DU may route the one or more incoming data packets through a normal bearer supported by the target DU.

FIG. 3G shows a flowchart illustrating a method of flow management for selective security mode for applying selective security, from an inter-UPF handover perspective according to an embodiment of the disclosure.

At operation 353, the method 300G includes determining, by a core network entity 107 associated with RAN of a currently serving DU, during a handover, status of the handover to be one of an inter-RAN handover or an inter-UPF handover.

At operation 355, the method 300G includes transmitting, by the core network entity 107, an information for performing the handover and an additional flow-based classification information from a UPF associated with the RAN of the serving DU to a UPF associated with the RAN of the target DU, when the status of the handover is determined to be the inter-UPF handover. In some embodiments, the additional flow-based classification information may include at least one of a header information corresponding to each of the one or more incoming data packets and data related to a selective security mode supported by the at least one of a RAN and UPF. The header information comprises at least one of a source IP address, a destination IP address, a source port, a destination port and a protocol.

At operation 357, the method 300G includes performing, by the core network entity 107, the handover from the UPF associated with the RAN of the serving DU to the UPF associated with the RAN of the target DU, based on the information transmitted for performing the handover.

At operation 359, the method 300G includes facilitating, by the core network entity 107, application of a selective security to one or more incoming data packets based on the additional flow-based classification information at a core network entity associated with the RAN of the target DU, post-handover. In some embodiments, if the additional flow-based classification information indicates a selective security mode preferred by the UE 101 as a dedicated bearer mode, the core network entity associated with the RAN of the target DU may determine a dedicated bearer supported by the serving DU based on data related to the preferred selective security mode included in the additional flow-based classification information. If the target DU is capable of supporting the dedicated bearer mode, the core network entity associated with the RAN of the target DU performs one of routing the one or more incoming data packets through one of a same dedicated bearer supported by the serving DU or a newly configured dedicated bearer supported by the target DU. However, if the target DU is not capable of supporting the dedicated bearer mode, the core network entity associated with the RAN of the target DU may route the one or more incoming data packets through a normal bearer supported by the target DU.

Computer System

FIG. 4 illustrates a block diagram of a computer system 400 for implementing embodiments consistent according to an embodiment of the disclosure.

In an embodiment, the computer system 400 may be a User Plane Function (UPF) 107 or in other words, core network entity 107 as illustrated in FIG. 1E. In some other embodiments, computer system 400 may be a Radio Access Network (RAN) 106 or a UE 101. The computer system 400 may include a central processing unit ("CPU" or "processor" or "memory controller") 402. The processor 402 may comprise at least one data processor for executing program components for executing user- or system-generated business processes. A user may include a network manager, an application developer, a programmer, an organization or any system/sub-system being operated parallelly to the computer system 400. The processor 402 may include specialized processing units such as integrated system (bus) controllers, memory controllers/memory management control units, floating point units, graphics processing units, digital signal processing units, etc.

The processor 402 may be disposed in communication with one or more Input/Output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an implementation, the preferred network 409 may be implemented as one of the several types of networks, such as intranet or Local Area Network (LAN) and such within the organization. The preferred network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the network 409 may include a variety of network devices, including routers, bridges, servers, computing devices, storage devices, etc. Using the network interface 403 and the network 409, the computer system 400 may communicate with a RAN 106 and one or more UEs 101.

In some embodiments, the processor 402 may be disposed in communication with a memory 405 (e.g., a random access memory (RAM) and a read-only memory (ROM), etc.) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data, such as the data, variables, records, etc. as described in this disclosure. Such databases may be implemented as fault-tolerant, relational, scalable, secure databases such as Oracle® or Sybase® or PostgreSQL®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®7/8, 10 etc.), APPLE® IOS®, GOOGLE™ ANDROID™, BLACKBERRY ° OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE ° MACINTOSH ° operating systems' Aqua®, IBM ° OS/2 ®, MICROSOFT ° WINDOWS ° (e.g., Aero, Metro, etc.), web interface libraries (e.g., ActiveX®, JAVA®, JAVASCRIPT®, AJAX, HTML, ADOBE ° FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE ° FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT ° exchange, Post Office Protocol (POP), Simple Mail Transfer Protocol (SMTP), or the like. In some embodiments, the computer system 400 may implement a mail client stored program component. The mail client may be a mail viewing application, such as APPLE ° MAIL, MICROSOFT ° ENTOURAGE®, MICROSOFT ° OUTLOOK®, MOZILLA ° THUNDERBIRD °, and the like.

FIG. 5 is a block diagram illustrating a structure of a UE according to an embodiment of the disclosure.

Referring to FIG. 5, the UE according to an embodiment may include a transceiver 510, a memory 520, and a processor 530. The transceiver 510, the memory 520, and the processor 530 of the UE may operate according to a communication method of the UE described above. However, the components of the UE are not limited thereto. For example, the UE may include more or fewer components than those described above. In addition, the processor 530, the transceiver 510, and the memory 520 may be implemented as a single chip. Also, the processor 530 may include at least one processor. Furthermore, the UE of FIG. 5 corresponds to the UE (101) of FIG. 1E or 4.

The transceiver 510 collectively refers to a UE receiver and a UE transmitter, and may transmit/receive a signal to/from a base station or a network entity. The signal transmitted or received to or from the base station or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the UE. Also, the memory 520 may store control information or data included in a signal obtained by the UE. The memory 520 may be a storage medium, such as read-only memory (ROM), random access memory (RAM), a hard disk, a compact disc-ROM (CD-ROM), and a digital versatile disc (DVD), or a combination of storage media.

The processor 530 may control a series of processes such that the UE operates as described above. For example, the transceiver 510 may receive a data signal including a control signal transmitted by the base station or the network entity, and the processor 530 may determine a result of receiving the control signal and the data signal transmitted by the base station or the network entity.

FIG. 6 is a block diagram illustrating a structure of a base station according to an embodiment of the disclosure.

Referring to FIG. 6, the base station according to an embodiment may include a transceiver 610, a memory 620, and a processor 630. The transceiver 610, the memory 620, and the processor 630 of the base station may operate according to a communication method of the base station described above. However, the components of the base station are not limited thereto. For example, the base station may include more or fewer components than those described above. In addition, the processor 630, the transceiver 610, and the memory 620 may be implemented as a single chip. Also, the processor 630 may include at least one processor.

The transceiver 610 collectively refers to a base station receiver and a base station transmitter, and may transmit/receive a signal to/from a terminal (UE) or a network entity. The signal transmitted or received to or from the terminal or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

Also, the transceiver 610 may receive and output, to the processor 630, a signal through a wireless channel, and transmit a signal output from the processor 630 through the wireless channel.

The memory 620 may store a program and data required for operations of the base station. Also, the memory 620 may store control information or data included in a signal obtained by the base station. The memory 620 may be a storage medium, such as read-only memory (ROM), random access memory (RAM), a hard disk, a CD-ROM, and a DVD, or a combination of storage media.

The processor 630 may control a series of processes such that the base station operates as described above. For example, the transceiver 610 may receive a data signal including a control signal transmitted by the terminal, and the processor 630 may determine a result of receiving the control signal and the data signal transmitted by the terminal.

FIG. 7 is a block diagram illustrating a structure of a network entity according to an embodiment of the disclosure.

Referring to FIG. 7, the network entity of the disclosure may include a transceiver 710, a memory 720, and a processor 730. The transceiver 710, the memory 720, and the processor 730 of the network entity may operate according to a communication method of the network entity described above. However, the components of the terminal are not limited thereto. For example, the network entity may include more or fewer components than those described above. In addition, the processor 730, the transceiver 710, and the memory 720 may be implemented as a single chip. Also, the processor 730 may include at least one processor. Furthermore, the network entity illustrated in FIG. 7 may correspond to the UPF 107 in FIG. 1E or core network entity 107 illustrated in FIG. 2A or 2C.

The transceiver 710 collectively refers to a network entity receiver and a network entity transmitter, and may transmit/receive a signal to/from a base station or a UE. The signal transmitted or received to or from the base station or the UE may include control information and data. In this regard, the transceiver 710 may include an RF transmitter for up-converting and amplifying a frequency of a transmitted signal, and a RF receiver for amplifying low-noise and down-converting a frequency of a received signal. However, this is only an example of the transceiver 710 and components of the transceiver 710 are not limited to the RF transmitter and the RF receiver.

Also, the transceiver 710 may receive and output, to the processor 730, a signal through a wireless channel, and transmit a signal output from the processor 730 through the wireless channel.

The memory 720 may store a program and data required for operations of the network entity. Also, the memory 720 may store control information or data included in a signal obtained by the network entity. The memory 720 may be a storage medium, such as ROM, RAM, a hard disk, a CD-ROM, and a DVD, or a combination of storage media.

The processor 730 may control a series of processes such that the network entity operates as described above. For example, the transceiver 710 may receive a data signal including a control signal, and the processor 730 may determine a result of receiving the data signal.

The methods according to the embodiments described in the claims or the detailed description of the disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number. Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

The various actions, acts, blocks, operations, or the like in the flowcharts (900 and 1000) may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Advantages of the embodiment of the disclosure are illustrated herein.

In an embodiment, the disclosure provides a method and apparatus for selecting a selective security mode for applying selective security and performing flow management for selective security during handover.

The disclosure provides a feature wherein the core network entity may apply a selective security for the one or more incoming data packets using a preferred selective security mode, which is determined based on the UE capability to support the selective security and the preferred selective security mode for applying the selective security. Also, in the disclosure, the core network entity may also determine whether the core network entity or the RAN are able to support the selective security and the preferred selective security mode as indicated by the UE. Therefore, the disclosure enables the UE to select the preferred selective security mode based on the capability and requirement of the UE. Secondly, based on the preferred selective security mode, the packet classification i.e., whether an incoming data packet is encrypted or unencrypted is determined either at the UPF or at the RAN. The method of classifying the packets at the UPF disclosed in the disclosure enables indicating whether the packets of a data flow are encrypted or unencrypted, and also the ciphering information and a single bit message for the entire data flow. Thus, the disclosure enables lesser data transmission between UPF and RAN to convey the packet classification and ciphering information, which leads to efficient usage of available bandwidth, thereby reducing network bandwidth. Moreover, due to the packet classification being performed at the UPF in the packet classification at the UPF mode, the RAN may simply use the ciphering information to apply the selective security on the one or more incoming data packets, as a result of which the processing overhead is reduced at the RAN, reduces the time taken to apply selective security to the one or more incoming data packets, and leads to reduced resource consumption. Therefore, overall, the disclosure improves the network performance and reduces the network overhead and processing overhead with respect to selective security procedure.

Further, when the UE has to undergo handover, the disclosure provides a method and apparatus for flow management for the selective security during such handover. During the handover, the core network entity may determine status of the security profile and transmits an additional flow-based classification information along with the handover information for performing the handover. The disclosure enables transmitting additional flow-based classification information during a handover. This in turn enables the core network entity associated with the RAN of the target DU or the RAN of the target DU to continue the classification of the data packets as per the preferred selective security mode and application of the selective security thereafter, in a lossless manner.

A description of an embodiment with several components in communication with each other does not imply that all such components are required. On the contrary a variety of optional components are described to illustrate the wide variety of possible embodiments of the disclosure.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The specification has described a method and apparatus for selecting a selective security mode for applying selective security and flow management for selective security for User Equipment (UE) under mobility. Further, the specification has described a method and apparatus for flow management for selective security during the handover. The illustrated steps are set out to explain the embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a core network entity, the method comprising:
   receiving, from a radio access network (RAN), a first information block comprising at least one of an indication of capability of a user equipment (UE) to support a selective security, and a preferred selective security mode from one or more selective security modes;
   determining whether at least one of the core network entity or the RAN is capable of supporting the preferred selective security mode indicated by the UE;
   determining whether each of one or more incoming data packets are encrypted or unencrypted based on header information of the each of the one or more incoming data packets and a length of un-ciphered headers in the each of the one or more incoming data packets, in case that the at least one of the core network entity or the RAN are determined to be capable of supporting the preferred selective security mode; and
   transmitting, to the RAN, ciphering information including information indicating whether the each of the one or more incoming data packets are encrypted or unencrypted and information indicating the length of the un-ciphered headers,
   wherein the selective security through the preferred selective security mode is applied to the each of the one or more incoming data packets based on the ciphering information.

2. The method of claim 1, wherein the core network entity comprises a user plane function (UPF) entity.

3. The method of claim 1, wherein the receiving the first information block comprises receiving the first information block during a protocol data unit (PDU) session establishment between the UE and the core network entity.

4. The method of claim 1, wherein the first information block further comprises an indication of presence of hardware accelerator (HWA) for the selective security.

5. The method of claim 1, further comprising:
   receiving, from the RAN, a second information block during a PDU session establishment between the UE and the core network entity, wherein the second information block comprises an indication of capability of the RAN to support the one or more selective security modes.

6. A method performed by a radio access network (RAN), the method comprising:
   transmitting, to a core network entity associated with the RAN, a first information block comprising at least one of an indication of capability of a user equipment (UE) to support a selective security, and a preferred selective security mode from one or more selective security modes;
   receiving, from the core network entity, information indicating whether at least one of the core network entity or the RAN is capable of supporting the preferred selective security mode indicated by the UE;
   receiving, from the core network entity, ciphering information including information indicating whether each of one or more incoming data packets are encrypted or unencrypted and information indicating a length of un-ciphered headers; and
   applying the selective security to the each of the one or more incoming data packets through the preferred selective security mode based on the ciphering information,
   wherein whether the each of the one or more incoming data packets are encrypted or unencrypted is determined based on header information of the each of the one or more incoming data packets.

7. The method of claim 6, wherein the core network entity comprises a user plane function (UPF) entity.

8. The method of claim 6, wherein the transmitting the first information block comprises transmitting the first information block during a protocol data unit (PDU) session establishment between the UE and the core network entity.

9. The method of claim 6, wherein the first information block further comprises an indication of presence of hardware accelerator (HWA) for the selective security.

10. The method of claim 6, further comprising:
   transmitting, to the core network entity, a second information block during a PDU session establishment between the UE and the core network entity, wherein the second information block comprises an indication of capability of the RAN to support the one or more selective security modes.

11. A core network entity comprising:

at least one processor; and at least one memory, communicatively coupled to the at least one processor, storing instructions executable by the at least one processor individually or in any combination to cause the core network entity to:

receive, from a radio access network (RAN), a first information block comprising at least one of an indication of capability of a user equipment (UE) to support a selective security, and a preferred selective security mode from one or more selective security modes, determine whether at least one of the core network entity or the RAN is capable of supporting the preferred selective security mode indicated by the UE, determine whether each of one or more incoming data packets are encrypted or unencrypted based on header information of the each of the one or more incoming data packets and a length of un-ciphered headers in the each of the one or more incoming data packets in case that the at least one of the core network entity or the RAN are determined to be capable of supporting the preferred selective security mode; and transmit, to the RAN, ciphering information including information indicating whether the each of the one or more incoming data packets are encrypted or unencrypted and information indicating the length of the un-ciphered headers, wherein the selective security through the preferred selective security mode is applied to the each of the one or more incoming data packets based on the ciphering information.

12. The core network entity of claim 11, wherein the core network entity comprises a user plane function (UPF) entity.

13. The core network entity of claim 11, wherein the instructions further cause the core network entity to:

receive the first information block during a protocol data unit (PDU) session establishment between the UE and the core network entity.

14. The core network entity of claim 11, wherein the first information block further comprises an indication of presence of hardware accelerator (HWA) for the selective security.

15. The core network entity of claim 11, wherein the instructions further cause the core network entity to:

receive, from the RAN, a second information block during a PDU session establishment between the UE and the core network entity, wherein the second information block comprises an indication of capability of the RAN to support the one or more selective security modes.

16. A Radio Access Network (RAN) comprising:

at least one transceiver; and at least one processor communicatively coupled to the at least one transceiver; and at least one memory, communicatively coupled to the at least one processor, storing instructions executable by the at least one processor individually or in any combination to cause the RAN to:

transmit, to a core network entity associated with the RAN, a first information block comprising at least one of an indication of capability of a user equipment (UE) to support a selective security, and a preferred selective security mode from one or more selective security modes, receive, from the core network entity, information indicating whether at least one of the core network entity or the RAN to is capable of supporting the preferred selective security mode indicated by the UE, receive, from the core network entity, ciphering information including information indicating whether each of one or more incoming data packets are encrypted or unencrypted and information indicating a length of un-ciphered headers, and apply the selective security to the each of the one or more incoming data packets based on the ciphering information, wherein whether the each of the one or more incoming data packets are encrypted or unencrypted is determined based on header information of the each of the one or more incoming data packets.

17. The RAN of claim 16, wherein the core network entity comprises a user plane function (UPF) entity.

18. The RAN of claim 16, wherein the instructions further cause the RAN to:

transmit the first information block during a protocol data unit (PDU) session establishment between the UE and the core network entity.

19. The RAN of claim 16, wherein the first information block further comprises an indication of presence of hardware accelerator (HWA) for the selective security.

20. The RAN of claim 16, wherein the instructions further cause the RAN to:

transmit, to the core network entity, a second information block during a PDU session establishment between the UE and the core network entity, wherein the second information block comprises an indication of capability of the RAN to support the one or more selective security modes.

* * * * *